(12) United States Patent
Cherian

(10) Patent No.: US 9,131,001 B2
(45) Date of Patent: Sep. 8, 2015

(54) SYSTEMS AND METHOD FOR REDUCED POWER WIRELESS COMMUNICATION

(71) Applicant: George Cherian, San Diego, CA (US)

(72) Inventor: George Cherian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 308 days.

(21) Appl. No.: 13/627,938

(22) Filed: Sep. 26, 2012

(65) Prior Publication Data

US 2013/0080650 A1 Mar. 28, 2013

Related U.S. Application Data

(60) Provisional application No. 61/539,644, filed on Sep. 27, 2011.

(51) Int. Cl.
*G06F 15/16* (2006.01)
*H04L 29/06* (2006.01)
*H04L 12/701* (2013.01)

(52) U.S. Cl.
CPC ............. *H04L 69/22* (2013.01); *H04L 45/00* (2013.01); *H04L 69/161* (2013.01); *H04L 69/162* (2013.01); *Y02B 60/43* (2013.01); *Y02B 60/50* (2013.01)

(58) Field of Classification Search
CPC ...... H04L 65/607; H04L 67/04; H04L 69/161
See application file for complete search history.

(56) References Cited

U.S. PATENT DOCUMENTS

| | | | |
|---|---|---|---|
| 7,451,197 B2* | 11/2008 | Davis et al. | 709/220 |
| 7,571,247 B2 | 8/2009 | Banerjee et al. | |
| 7,848,271 B2* | 12/2010 | Salomone et al. | 370/311 |
| 7,849,208 B2 | 12/2010 | Elzur et al. | |
| 2002/0083331 A1* | 6/2002 | Krumel | 713/200 |
| 2002/0156896 A1 | 10/2002 | Lin et al. | |
| 2003/0233463 A1* | 12/2003 | O'Connor | 709/230 |

(Continued)

FOREIGN PATENT DOCUMENTS

| | | |
|---|---|---|
| EP | 1322089 A2 | 6/2003 |
| EP | 2077653 A2 | 7/2009 |

OTHER PUBLICATIONS

"Advocating a Remote Socket Architecture for Internet Access Using Wireless LANs", Jan. 1, 2001, XP055046992, Retrieved from the Internet: URL:http://delivery.acm.org/10.1145/390000/380225/p23-schiager.pdf?ip=145.64.134.242&acc=ACTIVESERVICE &CFID=153534343&CFTOKEN=61029269&_acm_= 1354806904_7300ef2736afd3caf5f8a3fa3lcbcOcO [retrieved on Dec. 6, 2012].

(Continued)

*Primary Examiner* — Djenane Bayard
(74) *Attorney, Agent, or Firm* — S. Hossain Beladi

(57) ABSTRACT

In a particular embodiment, a method includes intercepting, at a first device, a message to be processed by a first protocol layer of the first device. The method also includes processing the message to a second protocol layer of the first device. The method further includes generating, at the first device, a packet based on an operand associated with the message. The method also includes transmitting the generated packet via a media access control (MAC) layer from the first device to a second device to enable the second device to host a protocol stack corresponding to the first protocol layer.

42 Claims, 7 Drawing Sheets

(56) References Cited

U.S. PATENT DOCUMENTS

2004/0054813 A1* 3/2004 Boucher et al. ............... 709/250
2007/0115873 A1 5/2007 Kim et al.
2010/0174808 A1 7/2010 Dabagh et al.
2012/0030360 A1* 2/2012 Sanders ........................ 709/227

OTHER PUBLICATIONS

International Search Report and Written Opinion—PCT/US2012/057466—ISA/EPO—Dec. 19, 2012.

* cited by examiner

SYSTEMS AND METHOD FOR REDUCED POWER WIRELESS COMMUNICATION

I. CROSS REFERENCE TO RELATED APPLICATIONS

The present application claims the benefit of and priority from U.S. Provisional Application No. 61/539,644 filed Sep. 27, 2011, the contents of which are expressly incorporated herein by reference in their entirety.

II. FIELD OF THE DISCLOSURE

The present application relates generally to wireless communication systems and more specifically to systems, methods, and devices for reduced power wireless communication.

III. BACKGROUND

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), a metropolitan area network (MAN), a local area network (LAN), or a personal area network (PAN). Networks also differ according to switching techniques and/or routing techniques used to interconnect various network nodes and devices (e.g. circuit switching vs. packet switching), a type of physical media employed for transmission (e.g. wired vs. wireless), and a set of communication protocols used (e.g. Internet protocol suite, Synchronous Optical Networking (SONET), Ethernet, etc.).

In a wireless communication system, a station (STA) (e.g., a mobile device) may access one or more network resources, such as a networked application server (e.g., an application server (AS)). Traditionally, for the STA to communicate with the AS, the STA opens and maintains a standardized transport protocol stack, such as a transmission control protocol (TCP)/Internet protocol (IP) stack. Because the transport protocol stack is standardized, the STA may be required to expend resources, such as processing time, battery power, and bandwidth, to support aspects (e.g., features) of the transport protocol stack that may not be applicable or important to the STA. For example, the TCP/IP standard requires additional programming to communicate data, such as programming to include a series of packet headers in transmitted messages, to parse header fields of received messages, and to monitor for and respond to various control signals (e.g., address resolution protocol (ARP) signaling, TCP keep alive signaling, and discovery protocols messages, such as a universal plug and play (UPnP) message, a Bonjour message, etc.).

IV. SUMMARY

Systems, methods, and devices for reduced power wireless communication are described herein. The present disclosure includes a reduced power access network layer (e.g., supported by a reduced power communication processor) that may be utilized in a communication network by a station (STA), an access point (AP), and/or an application server (AS). For example, the STA may implement aspects of a STA reduced power access network layer that enables an application (e.g., software implemented by a processor) of the STA to use a traditional transport protocol stack (e.g., a transmission control protocol (TCP)/Internet protocol (IP) stack) without having the STA host the TCP/IP stack. For example, the TCP/IP stack may be hosted by the AP that the STA is associated with.

An application (e.g., an application executed by a processor of the STA), such as an Internet browser application or an e-mail application, may initiate communication of one or more messages (e.g., a network communication) to the application server. For example, the message may include a socket call to a socket corresponding to a communication channel (e.g., of a wired or wireless network) with the application server. In a particular embodiment, the socket call includes a connect request to establish a connection (e.g., a communication channel) with the application server. Typically, such a socket call may cause a transport protocol stack, such as a TCP/IP stack, to be opened and maintained at the STA to support the connection with the application server. Opening and maintaining (e.g., "keeping alive") a TCP/IP stack and/or an associated network processor may consume power at the STA.

In accordance with the disclosed systems and methods, a reduced power access network layer of the STA (which may be associated with a separate low-power network processor at the STA) may be configured to intercept messages (e.g., socket calls that would otherwise result in opening and/or use of a TCP/IP stack at the STA) from the application of the STA. The reduced power layer may generate a reduced power communication packet (e.g., a data packet in a reduced power communication format) that is provided to the AP. The reduced power communication packet may include the payload of the intercepted message and one or more operands associated with the STA. The reduced power communication packet may utilize fewer bits than a traditional message, such as a socket request (e.g., a TCP/IP formatted socket request). The reduced power layer of the STA may send the packet to the AP to which the STA is connected (e.g., associated with) or other STA to which the STA is peer-to-peer connected. The AP may maintain (e.g., host) a transport protocol stack (e.g., a TCP/IP stack) including a transport protocol layer on behalf of the STA and may be configured to generate transport protocol packet (e.g., a TCP/IP packet) based on the received reduced power communication packet that is sent to the AP. Accordingly, the STA may delegate hosting of the transport protocol stack (e.g., the TCP/IP stack) to the AP. The AP may perform various functions that would otherwise have been performed at the STA (e.g., packet header processing, monitoring and responding to control signals, etc.). By causing the transport protocol stack (and corresponding network processor or networking processing functions) to be hosted at the AP on behalf of the STA, the STA may realize power and time savings when communicating with the AS.

In a particular embodiment, a method includes intercepting, at a first device (e.g., a station (STA)), a message (e.g., a socket call) to be processed by a first protocol layer (e.g., a transmission control protocol (TCP)/Internet protocol (IP) layer executed by a first network processor) of the first device. The method also includes processing the message at a second protocol layer (e.g., an access network layer executed by the first processor or by a second network processor) of the first device. The method further includes generating a packet at the first device. The packet may include a payload of the intercepted message and may also include and/or be based on one or more operands associated with the message and/or first device. The method also includes transmitting the generated packet via a media access control (MAC) layer from the first device to a second device (e.g., an access point (AP) or another STA) to enable the second device to host a protocol stack (e.g., a TCP/IP stack) corresponding to the first device (e.g., the first protocol layer). For example, the second device may implement the first protocol layer and/or functions corresponding to the first network processor on behalf of the first device.

In another particular embodiment, an apparatus includes a processor configured to intercept a message to be processed by a first protocol layer, to process the intercepted message at a second protocol layer, and to generate a packet based on an operand associated with a first protocol stack. The apparatus further includes a transmitter configured to transmit the generated packet via a media access control (MAC) layer to enable a receiving device to host a second protocol stack.

In another particular embodiment, a method includes receiving, from a first device, a packet via a media access control (MAC) layer at a second device. The packet comprises an operand and a message to a protocol layer. The method also includes providing, at the second device, the message to a protocol layer at a hosted protocol stack based on the received packet.

In another particular embodiment, an apparatus includes a receiver configured to receive a packet via a media access control (MAC) layer. The packet including an operand and a message to be processed by a protocol layer. The apparatus also includes a processor configured to generate the message for the protocol layer based the received packet and to provide the generated message to the protocol layer.

One particular advantage provided by disclosed embodiments is an ability of a STA to delegate hosting of a transport protocol stack (e.g., a TCP/IP stack) to another device (e.g., another STA or an AP). By delegating hosting of the transport protocol stack to the AP, the STA may realize resource savings, such as saving of processing time, battery power, and bandwidth, that would otherwise be used to support aspects (e.g., features) of the transport protocol stack that may not be applicable or important to the STA. The AP may also perform one or more programming functions associated with maintaining the transport protocol stack on behalf of the STA. For example, the AP may perform programming to include a series of packet headers in transmitted messages, to parse header fields of received messages, and to monitor for and respond to various control signals (e.g., address resolution protocol (ARP) signaling, TCP keep alive signaling, and discovery protocols message, such as a UPnP message, a Bonjour message, etc.).

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
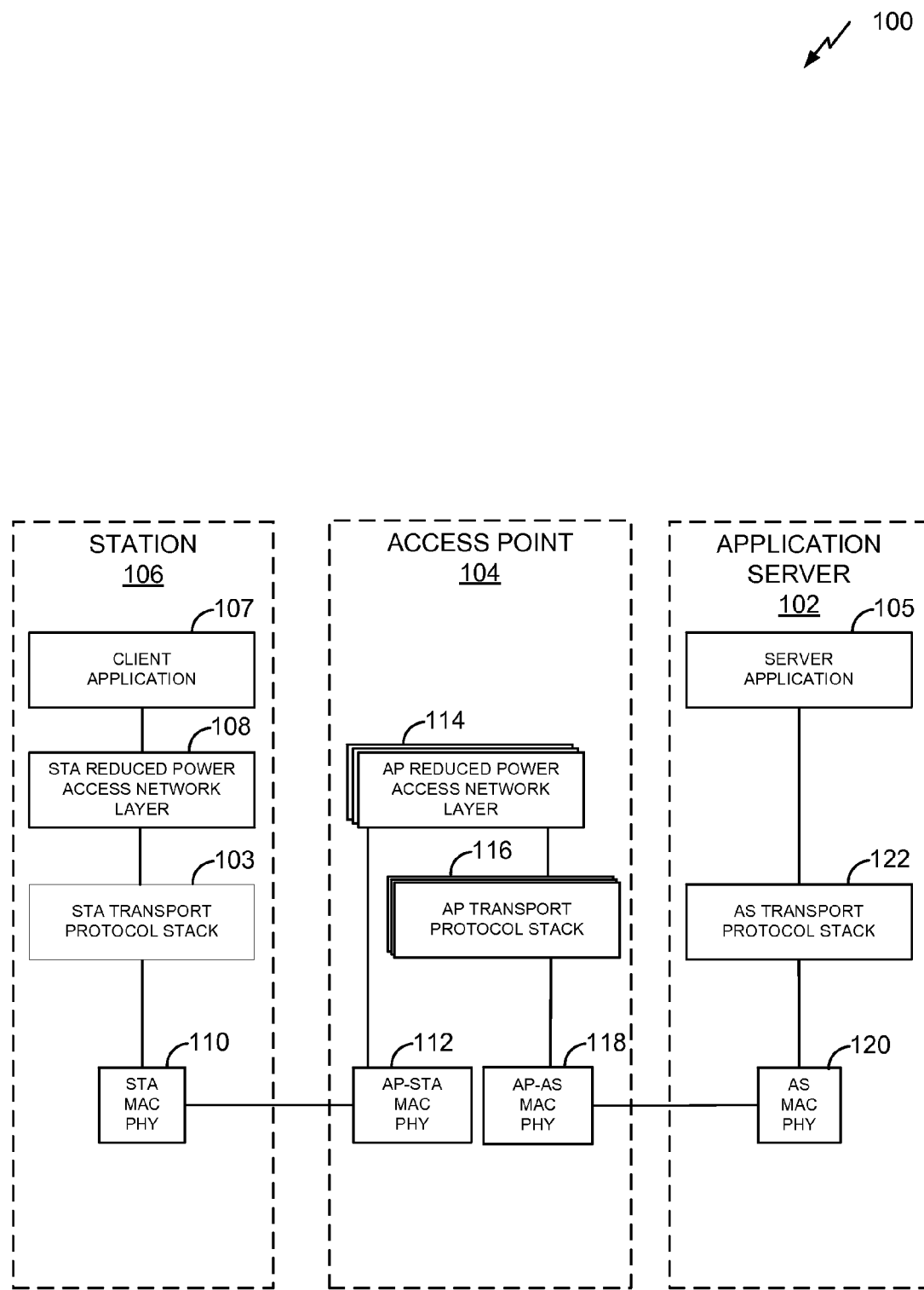
FIG. 1 is a diagram that illustrates a first particular embodiment of a reduced power wireless communication system.

Referring to FIG. 1, a wireless communication system 100 includes a STA 106 (e.g., a laptop computer, a personal digital assistant (PDA), a mobile phone, etc.), an AP 104, and an application server (AS) 102. In a particular embodiment, the wireless communication system 100 may include a wireless network, a wired network, or a combination thereof. The AP 104 may serve as a base station (e.g., a hub) for a wireless local area network (WLAN) which one or more STAs, such as the STA 106, may be connected to. In a particular embodiment, the WLAN may operate in accordance with one or more standards, such as an Institute of Electrical and Electronics Engineers (IEEE) 802.11 standard (e.g., IEEE 802.11ah protocol, which uses sub-1 GHz bands).

The STA 106 may include a client application 107, a STA transport protocol stack 103, and a STA reduced power access network layer 108. In a particular embodiment, the STA transport protocol stack 103 and the STA reduced power access network layer 108 correspond to (e.g., are implemented using) one or more network processors, as further described with reference to FIG. 2. Thus various functions described with reference to protocol stacks or protocol layers herein may be understood, in some embodiments, as performed by network processors. Further, various functions described with reference to network processors herein may be understood, in some embodiments, as being associated with protocol stacks or protocol layers.

The client application 107 (e.g., software) may be executed (e.g., run) by a processor (not shown) of the STA. The client application 107 (e.g., the processor running the client application 107), such as an Internet browser application or an e-mail application, may be configured to initiate one or more messages (e.g., a network communication) to the AS 102. For example, a message may include a socket call to a socket corresponding to a communication channel associated with the AS 102. In a particular embodiment, the socket call includes a connect request to establish a connection (e.g., a communication channel) with the AS 102. The socket call including the connect request may cause a transport protocol stack, such as a transmission control protocol (TCP)/Internet protocol (IP) stack, to be opened and maintained, at the STA, to support the connection with the AS 102.

In a particular embodiment, the client application 107 may be configured to access a server application 105 hosted on in the AS 102. For example, the client application 107 may be configured to open and maintain a TCP/IP connection. A STA media access control (MAC) physical link layer 110 (STA MAC PHY), such as a WiFi connection, may be initiated with a corresponding AP-STA MAC PHY included in AP 104. The AP 104 may then bridge traffic (which may include IP packets that encapsulate an application payload) from the STA 106 to an AP-AS MAC physical link layer 112 (AP-AS MAC PHY), such as Ethernet or WiFi. The AP-AS MAC physical link layer 118 may be coupled with a corresponding AS MAC physical link layer 120 (AS MAC PHY) included in the AS 102. Additionally, when the STA 106 hosts the STA transport protocol stack 103 (e.g., uses a transport protocol layer of the STA transport protocol stack 103), a control signal from the AS 102 may be processed and transmitted twice, in its entirety, (e.g., from the AS 102 to the AP 104 and from the AP 104 to the STA 106). As noted above, the more data that is transmitted between the AP 104 and the STA 106, the more power that may be consumed by each of the AP 104 and the STA 106. Furthermore, the increased traffic in the AP 104 may lead to access collisions. Access collisions may occur when multiple data packets coincide when being used on a shared link. Collisions may generally be resolved by introducing transmission timing schemes such that devices are sufficiently staggered in their transmissions or incorporate collision detection processing coupled with retransmission. Either of these approaches may increase the processing complexity and power consumption of the communication devices.

For example, a TCP/IP standard (e.g., a TCP/IP protocol) may define a series of packet headers that are included in transmitted messages associated with an application. These additional elements of data may account for sixty octets of additional wireless traffic in an IPv6 system. Furthermore, the STA 106 may require additional programming to communicate in accordance with the TCP/IP standard. For example, processing may be required to parse header fields or respond to control signaling such as keep-alive messages. The TCP/IP protocol may also require various control signaling which the STA 106 is required to listen for and respond to, each of which increases power usage and takes processing resources away from other STA functions. Examples of such control signaling includes address resolution protocol (ARP), TCP keep alive signaling, and signaling messages for device discovery protocols such as a UPnP message, a Bonjour message, etc.

Rather than communicating with the AS 102 (e.g., the server application 105) via a full transport protocol stack (e.g., the STA transport protocol stack 103, such as an entire transmission control protocol (TCP)/Internet protocol (IP) stack) maintained at the STA 106, the described techniques may enable the STA 106 to use the reduced power access network layer 108 (e.g., a network access layer or a separate network processor) to communicate with the AS 102. The client application 107 may continue to access the AS 102 as if the STA 106 maintained the STA transport protocol stack 103; however, the underlying socket management will be transparently altered from the perspective of the client application 107. For example, a connect socket request to be processed by a TCP/IP network processor (not shown) may be intercepted and processed by the STA reduced power access network layer (or processor) 108. The STA reduced power access network layer 108 may be part of the TCP/IP network processor or may be a different network processor.

The client application 107 (e.g., an Internet browser, an email application, etc.) may be configured to access a server application 105 hosted on the AS 102. The STA reduced power access network layer 108 may be implemented using hardware, software (e.g., processor-executable instructions), or a combination thereof. The STA reduced power access network layer 108 may be configured to intercept messages, such as network communications (e.g., socket calls), initiated by the client application 107 and generate one or more packets, based on the network communication, that are suitable for reduced power communication as explained below.

The STA reduced power access network layer 108 does not generate TCP/IP messages such as IP address assignment protocols (e.g., a dynamic host configuration protocol (DHCP), or TCP messages such as SYN, ACK, FIN, etc.). Instead, the STA reduced power access network layer 108 may convert (e.g., encode) an intercepted socket request to a reduced power communication packet (e.g., a reduced power communication format) that includes a data payload having an operand (e.g., connect, bind, listen, accept, get host by name, and get host by address) and associated parameters used in the socket call. The reduced power communication format utilizes fewer bits than a traditional socket request (e.g., a TCP/IP formatted socket request).

In a particular embodiment, the STA reduced power access network layer 108 may also be configured to construct (e.g., generate) a data payload (e.g. the reduced power communication packet) for transmission based on multiple messages intercepted from the client application 107. One or more of the multiple messages may be concatenated, compressed, or otherwise efficiently stored into a single payload. For example, the STA reduced power access network layer 108 may identify a message awaiting transmission (e.g., a message buffered or queued at a transmitter (not shown) of the STA) having an attribute (e.g., an operand, a parameter, or a combination thereof) in common with a message being processed and, based on the identified message, discard the message being processed.

The STA 106 may transmit the generated reduced power communication packet from a STA media access control (MAC) physical link layer (PHY) 110 of the STA 106 to a corresponding AP-STA MAC PHY 112 of the AP 104. The reduced power communication packet may be transmitted via a media access control (MAC) layer so as to allow a receiving device, such as the AP 104, to host a protocol stack for the first protocol layer (e.g., the TCP/IP layer). The AP 104 may be configured to host and maintain an AP reduced power access network layer 114 for each STA that is associated with the AP 104. In a particular embodiment, each AP reduced power access network layer 114 may have a corresponding AP transport protocol stack 116.

The AP 104 may receive the reduced power communication packet from the STA 106 and provide the reduced power communication packet to the AP reduced power access network layer 114. The AP reduced power access network layer 114 may be configured to generate a socket call (e.g., initiate a TCP/IP socket call) suitable for transmission via a standard transport protocol (e.g., TCP/IP) based on the reduced power communication packet. Once a standard socket call has been generated, the AP 104 may utilize an AP transport protocol stack 116 of the AP 104 (maintained on behalf of the STA 106) to generate a TCP/IP message (e.g., a TCP/IP packet) associated with a physical IP address based on the received reduced power communication packet.

The AP transport protocol stack 116 may support a transport link (e.g., an Ethernet or a WiFi link that utilizes TCP/IP protocols), such as the AP-AS MAC PHY 118 which corresponds to AS MAC PHY 120 included in the AS 102. The AP 104 may map the transport link (e.g., the AP-AS MAC PHY 118) of the AP 104 to the corresponding AP-STA MAC PHY 112 via which the AP 104 received the reduced power communication packet. For example, the AP 104 may store in a memory a table that includes a physical MAC address and an associated TCP/IP link setup by the AP 104 on behalf of the STA 106. Thus, an association (e.g., a relationship) may be created between the STA reduced power access network layer 108 and the physical IP address assigned to the AP reduced power access network layer 114.

To reduce an amount of time used to process a reduced power communication packet received via the AP-STA MAC PHY 112 (and establish the AP transport protocol stack on behalf of the STA 106), the AP 104 may be configured to maintain a pool (e.g., a group) of IP addresses, ports, memory, computing resources, power, or a combination thereof, for processing reduced power communication packets to be transmitted via the AP 106. In a particular embodiment, the AP 106 may maintain the pool of resources by adaptively sizing the pool of resources based on resource demand. Thus, the AP 104 may bridge traffic from the STA 106 to the AS MAC PHY 120 of the AS 102 via the AP-AS MAC PHY 118 of the AP 104 that was established on behalf of the STA 106.

The AS 102 may include a AS transport protocol stack 122 configured to process and decode received TCP/IP packets as well as handle related control signaling. Once the AS transport protocol stack 122 has processed the socket call (e.g., combined packets, performed error detection, or performed decoding), the assembled data is provided to the server application 105.

It will be understood that data originating with the AS 102 destined for the STA 106 may be handled in a similar fashion as described above, albeit in reverse. For example, the server application 105 may "push" one or more messages to the client application 107. In a particular embodiment, the one or more pushed messages may be responsive to the socket call initiated by the STA 106 and provided to the AS 102 via the AP 104. The server application 105 may transmit the one or more messages through the AS transport protocol stack 122 via the AS MAC PHY 120 to the AP 104. The AP transport protocol stack 116 may receive the one or more messages via AP-AS MAC PHY 118 and may process the received data, such as by removing TCP/IP headers and translating the one or more messages to a reduced power communication format. In a particular embodiment, the AP reduced power access network layer 114 may remove header information (e.g., TCP/IP header) from the one or more messages to generate a reduced power communication packet.

Using the AP-STA MAC PHY 112, the reduced power communication packet may be transmitted to the STA 106. In a particular embodiment, prior to transmitting the reduced power communication packet to the STA 106, the AP reduced power access network layer 114 may compare an attribute of the reduced power communication packet with an attribute of the previously generated packet and may discard the reduced power communication packet when a determination is made that the attribute matches the attribute of the previously generated packet.

The STA MAC PHY 110 may be configured to receive the reduced power communication packet and provide the reduced power communication packet to the STA reduced power access network layer 108. The STA reduced power access network layer 108 may then provide the packet, or an assembly of multiple packets, representing the data transmitted by the server application 105, to the client application 107.

In a particular embodiment, the AP 104 may receive and respond to one or more control signals (e.g., an address resolution protocol (ARP) signal, a keep-alive signal, and a discovery protocol signal) on behalf of the STA 106. For example, the TCP/IP connection between the AS 102 and the AP 104 (on behalf of the STA 106) may require one or more control signals associated with the socket call to be transmitted (e.g., periodically) to maintain the TCP/IP connection. The AP reduced power access network layer 114 may respond to the messages issued by the AS 102 on behalf of the STA 106. In a particular embodiment, the AP 104 may be configured to check the status of the STA 106 (e.g., transmit one or more control signals) using a less power consuming method (e.g., few data bytes, lower computational complexity), and/or with lower frequency than required by the TCP standards. Accordingly, the TCP/IP connection may be maintained by the AP 104 without having to send and receive the TCP/IP control signals between the AP 104 and the STA 106, thus conserving power and reducing traffic for both the AP 104 and the STA 106.

In another particular embodiment, the STA 106 may be configured to discover the services provided by other STAs connected to the AP 104. For example, the client application 107 on the STA 106 may be configured to use discovery protocols, such as a UPnP protocol or a Bonjour protocol, that use a multicast IP address packet to advertise or search for a capability associated with the STA 106. Additionally, the STA 106 may listen for the discovery protocol messages (e.g., discovery requests) transmitted from other STAs.

The reduced power access network layer 108 may intercept a discovery request initiated by the client application 107 and generate/transmit a reduced power access network layer signaling message to the reduced power access network layer 114 of AP 104. In a particular embodiment, the reduced power access network layer signaling message indicates the service that the client application 107 is interested in discovering. The reduced power access network layer 114 may direct the AP transport protocol stack 116 to identify the multicast IP address packet and the discovery service requested by the STA 106. The AP transport protocol stack 116 (e.g., a transport layer) may be configured to monitor the multicast IP packets on the network on behalf of the STA 106 and report back to the AP reduced power access network layer 114 (e.g., a access network layer) when the service is discovered. Accordingly, the reduced power access network layer 108 of STA 106 may be configured to transmit information to the reduced power access network layer 114 of AP 104 about a service the STA 106 wants to advertise. The transport protocol 116 may use a multicast IP address to frequently advertise the service. In a similar manner, the STA 106 may advertise the client application 107 (e.g., a service the STA 106 provides), using the same process, but in reverse.

In a particular embodiment, the discovery protocols may use a multicast IP address(es) to advertise a capability supported by one STA, which are listened by the other STAs in the system to discover the services supported by other STAs. When the client application 107 on STA 106 is interested in a discovering a particular service, the client application 107 may initiate a multicast IP socket to be opened. The reduced power access network layer 108 may intercept this socket request and generate/transmit a reduced power access network layer signaling message to the AP reduced power access network layer 114. The signaling message may also include one or more parameters, such as an indication of the service that the client application 107 is interested in discovering. The reduced power access network layer 114 may direct the AP transport protocol stack 116 to identify one or more multicast IP packet and the discovery service requested by the STA 106. The AP transport protocol stack 116 may be configured to monitor the multicast IP packets communicated within the wireless communication system 100 on the network on behalf of the STA 106, and report back to reduced power access network layer 314 if the service is discovered. The STA 106 may advertise the application (e.g., a service the STA 106 provides) in a similar manner, using the same pathway but in reverse. The reduced power access network layer 314 of STA 106 may be configured to transmit information to the AP reduced power access network layer 114 about the service the STA 106 wants to advertise. The transport protocol 116 may use a multicast IP address to frequently advertise the service.

In a particular embodiment, the amount of signaling required by the STA 106 to maintain connections with the AS 302 may be reduced. For example, in some client applications, such as the client application 107, IP related multi-cast messages may be used. These IP related multi-cast messages may be multicast for duplicate address detection or discovery messages. The AP reduced power access network layer 114 may consolidate these messages by coordinating the multicasting from the AP 104 rather than the STA 106 coordinating the multicasting. Similarly, some TCP connections require keep-alive messages to be transmitted at an interval to maintain a connection associated with a TCP/IP stack. The AP reduced power access network layer 114 may respond to these messages on behalf of the STA 106. The AP 104 may be configured to check the status of the STA 106 using a less power consuming method (e.g., few data bytes, lower computational complexity), and/or with lower frequency than required by the TCP standards.

The AP 104 hosting the AP transport protocol stack 116 on behalf of the STA 106 may result in fewer messages (e.g., less data) transmitted between the STA 106 and the AS 102 as compared to instances when the STA 106 hosts (e.g., communicates with the AS 102 using) the STA transport protocol stack 103. Additional, the AP 104 hosting the AP transport protocol stack 116 on behalf of the STA 106 may also result in fewer messages that the AP 104 may handle.

In another particular embodiment, performance of the STA 106 may be enhanced by reducing the amount of time used to complete a communication cycle between the client application 107 and the server application 105. For example, the AP 104 may be configured to establish a pool of IP addresses before a particular IP address is needed. Accordingly, when the AP reduced power access network layer 114 has generated the packet suitable for transmission via a standard transport protocol (e.g., using the AP transport protocol stack 116), the particular IP address may be available to use for the transmission. The IP address pool may be adaptively controlled (e.g., by a processor (not shown) of the AP 104) such as by altering a size of the pool based on demand. Other resources used for socket communication may also be pooled by the AP 104 such as ports, memory, computing resources, or power.

Accordingly, the reduced power access network layer of the STA 106 and the AP 104, as described herein, enables the AP 104 to support the AP transport protocol stack 116 on behalf of the STA 106 and, thus, reduces power expended by and traffic communicated between the AP 104 and the STA 106.

Figure 2:
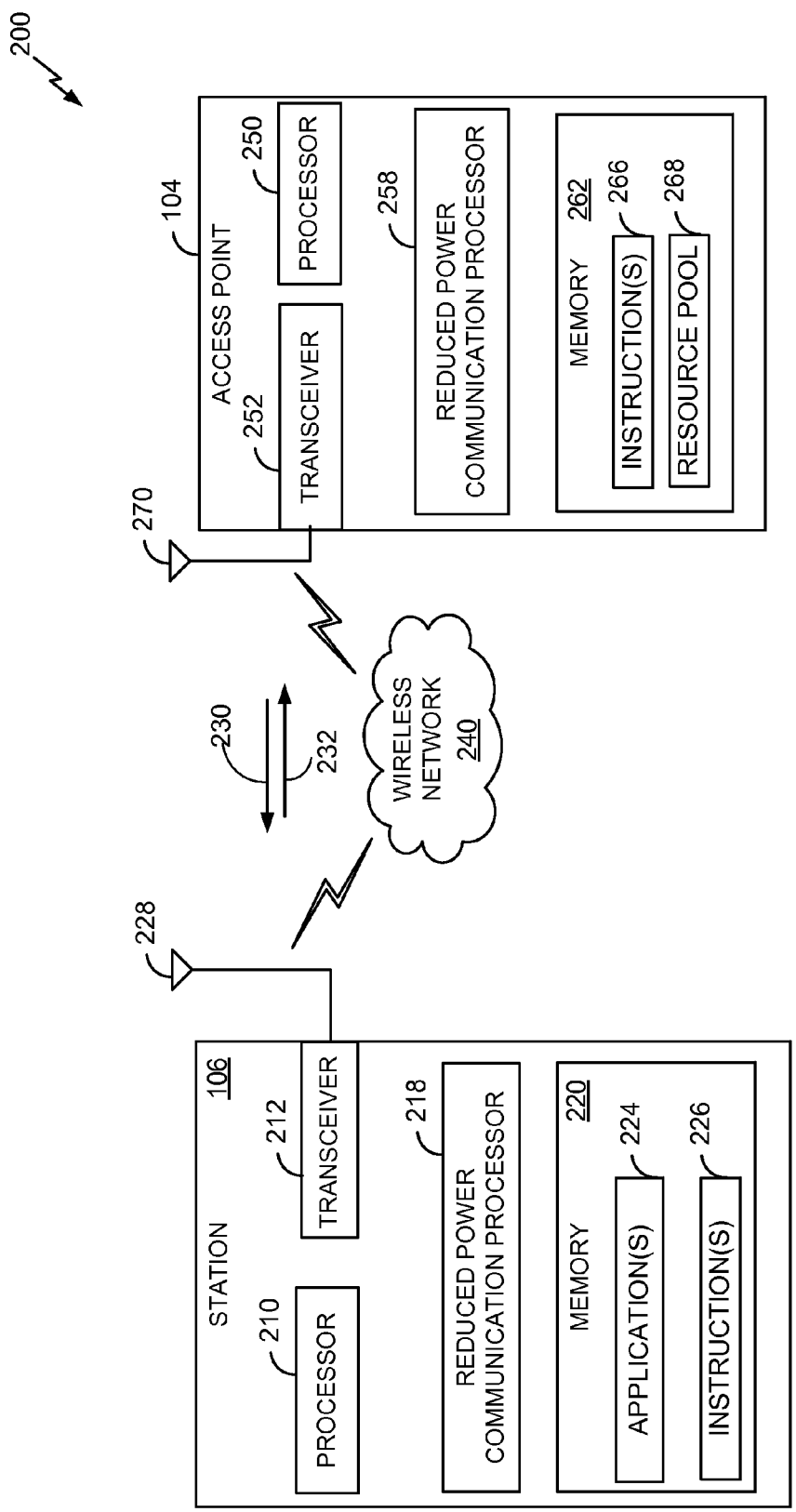
FIG. 2 is a diagram that illustrates a second particular embodiment of a reduced power wireless communication system.

Referring to FIG. 2, a diagram to illustrate an exemplary wireless communication system is shown and generally designated 200. The system 200 may include a station (STA) 106 and an access point (AP) 104. The STA 106 may be communicatively coupled to the AP 104 via a network 140 (e.g., a wireless network). The network 140 may include a wireless network, a wired network, or a combination thereof.

The STA 106 may include a processor 210, a transceiver 212, a reduced power communication processor 218, a memory 222, or combinations thereof.

The processor 210 may include one or more of the processor unit(s) that may be collectively referred to as a central processing unit (CPU). The processor 210 may be configured to control operation of the STA 106. For example, the processor 210 may be configured to perform logical and arithmetic operations based on instructions 226 (e.g., software) and data stored within the memory 222. The processor 210 may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information. Where the processor 210 includes a digital signal processor (DSP), the processor may be configured to generate a packet for transmission. In a particular embodiment, the packet includes a physical layer data unit (PPDU).

The processor may support (e.g., opens and maintains) a transport protocol stack (e.g., a TCP/IP stack) to enable network communication between the STA 106 and a network server (not shown), such as the network server 102 of FIG. 1. For example, the network protocol stack of the STA may include the STA transport protocol stack 103 of FIG. 1. In a particular embodiment, the transport protocol stack may enable network communication between an application 224, such as the client application 107 of FIG. 1, and a server application of the application server, such as the server application 105 of the AP 102 of FIG. 1.

The memory 222 (e.g., machine-readable media) may include one or more applications 224 and instructions 226 (e.g., software). Software shall be construed broadly to mean any type of instructions, whether referred to as software, firmware, middleware, microcode, hardware description language, or otherwise. The memory 222 may include both read-only memory (ROM) and random access memory (RAM). A portion of the memory 222 may also include non-volatile random access memory (NVRAM).

The instructions 226 may include code (e.g., in source code format, binary code format, executable code format, or any other suitable format of code). The instructions 226, when executed by the processor 210, cause the STA 106 to perform one or more functions. The instructions 226 in the memory 222 may be executable to implement the methods herein. For example, the instructions 226 may cause the processor 110 to access one or more network resources, such as a networked application server (not shown).

The processor 210 may direct communications (e.g., messages) initiated by the application 224 to the reduced power communication processor 218. The processor 110 may also process received communications (e.g., received packets) received via the antenna 228. The processor 210 may be configured to determine (e.g., identify) whether a received communication (e.g., a received message or packet) includes a reduced power communication packet. Where the received communication includes the reduced power communication packet, the reduced power communication processor 118 may be used to process the reduced power communication packet. In a particular embodiment, the processor 210 may include the reduced power communication processor. The processor 210 may intercept a message initiated by the application 224 and to be processed by a first protocol layer (e.g., a transport protocol layer) and cause the message to be processed by a second protocol layer (e.g., an access network layer) associated with (e.g., maintained by) the reduced power communication processor 218. Accordingly, the processor 201 may provide the message to a destination (e.g., the second protocol layer) that is different than a destination (e.g., a first protocol layer) intended by the application 224. Alternatively or in addition to, the reduced power communication processor may intercept the message to be processed by to the first protocol layer and cause the message to be processed by second protocol layer.

The reduced power communication processor 218 may be configured to generate a packed based on an operand of the message (e.g., a socket communication, such as a socket call). For example, the reduced power communication processor 218 may be configured to open and maintain an access network layer, such as the STA reduced power access network layer 108 of FIG. 1, to generate the packet. The reduced power communication processor 218 may be configured to encode one or more socket communications (e.g., a socket call), such as a connect request generated by the application 124, into a reduced power communication (e.g., a reduced power format utilizes fewer bits than the intercepted message, such as an intercepted socket request). For example, the reduced power communication processor 218 may intercept a connect request including several parameters and generate a single datagram representing the operand (e.g., connect) and the associated parameters. In a particular embodiment, the reduced power communication processor 218 generates a packet based on an operand and one or more parameters of the intercepted message. Other operands that may be associated with the message may include bind, listen, accept, get host by name, and get host by address.

The reduced power communication processor 218 may be configured construct a data payload for transmission from the STA 106 based on one or more encoded messages (e.g., one or more encoded messages). For example, the reduced power communication processor 218 may concatenate multiple messages into a single payload where adequate bandwidth is available for both messages. The reduced power communication processor 218 may also compress or otherwise optimize the one or more encoded messages. For example, reduced power communication processor 218 may identify a message awaiting transmission (e.g., buffered or queued at the transceiver 212) having an attribute (e.g., operand or parameter) in common (e.g., a match) with a message currently being processed. Based on a match, the reduced power communication processor 218 may discard the message currently being processed. When no match is determined, the message currently being processed may be provided to the transceiver 212 to be transmitted.

In a particular embodiment, the reduced power communication processor 218 may also be configured to identify a previously generated packet awaiting transmission. The reduced power communication processor 218 may compare an attribute of a currently generated packet (e.g., a currently generated packet) with an attribute of the previously generated packet. Where the attribute of the currently generated packet matches the attribute of the previously generated packet, the payload generator may discard the currently generated packet.

The reduced power communication processor 218 may also be configured to decode a packet, such as a packet received by the STA 106 via the antenna 1128, from the reduced power format to a transport protocol format. For example, the reduced power communication processor 218 may be configured to provide a received packet (e.g., having a reduced power format) to the application 124, as if the received packet were received directly from a destination associated with an intercepted socket call (e.g., a first protocol layer, such as a transmission control protocol (TCP)/Internet protocol (IP) layer). Thus, the application 124 may receive an output from the reduced power communication processor 218 based on the received packet without an indication of where a TCP/IP stack is hosted (e.g., a location of the TCP/IP stack is transparent to the application 124).

The transceiver 212 may be coupled to the antenna 228 and include a transmitter and/or a receiver (not shown). The transmitter (e.g., a transmit portion) of the transceiver 212 may be configured to wirelessly transmit packets and/or signals via the antenna 228. For example, the transmitter may be configured to transmit different types of packets generated by the processor 210, the reduced power communication processor 218, or a combination thereof. The packets to be transmitted may each be made available to the transmitter. For example, the reduced power communication processor 218 may store a packet in the memory 222 and the transmitter may be configured to retrieve the packet. Once the transmitter retrieves the packet, the transmitter (e.g., the transceiver 212) transmits the packet via the antenna 228.

The transmitter may be configured to immediately transmit the packet/signals or may buffer or queue the packet/signals prior to transmission. In a particular embodiment, the transmitter (e.g., the transceiver) may be configured to transmit a generated packet via a media access control (MAC) layer so as to allow a receiving device (e.g., the AP 104) to host a protocol stack for a first protocol layer (e.g., a TCP/IP layer).

The receiver (e.g., a receive portion) of the transceiver 212 may be configured to receive a packet responsive to a messages intercepted by one of the processor 210 and the reduced power communication processor 218. The receiver may also be configured to process packets/signals detected by the antenna 228 and provide the packets/signals to the processor 210, the reduced power communication processor 218, or a combination thereof. In a particular embodiment, the receiver (e.g., the transceiver) may store a received packet in the memory 220 and the reduced power communication processor 218 may be configured to retrieve the packet from the memory 220 for further processing.

The STA 106 may be coupled to the AP 104 via the wireless network 240. A communication link that facilitates transmission from the AP 104 to the STA 106 may be referred to as a downlink (DL) 230, and a communication link that facilitates transmission from the STA 106 to the AP 104 may be referred to as an uplink (UL) 232. Alternatively, the downlink 230 may be referred to as a forward link or a forward channel, and the uplink 232 may be referred to as a reverse link or a reverse channel.

The AP 104 may include a processor 250, a transceiver 252, a reduced power communication processor 258, and a memory 162. The processor 250, the transceiver 252, the reduced power communication processor 258, and the memory 262 of the AP 104 may operate in a similar manner as the processor 210, the transceiver 212, the reduced power communication processor 218, and the memory 222 of the STA 106, respectively, as described above. Additional functionalities of the components of the AP 104 are described below.

The transceiver 252 may be coupled to the antenna 270 and include a transmitter and/or a receiver (not shown). The receiver (e.g., a receive portion) of the transmitter 252 may be configured to receive a packet from the STA 106 on a media access control (MAC) layer. The packet may be received from the STA 106 and include an operand and parameters for a message, such as a socket call associated with the application 224 of the STA 106, to be processed by a protocol layer (e.g., a transport protocol layer). The receiver may provide the received packet to the processor 250, the reduced power communication processor 258, the memory 262, or a combination thereof. Where the received packet is provided to the memory 262, the received packet may be stored such that the received packet is accessible by one or more of the processor 250 or the reduced power communication processor 258 for processing. The receiver, the processor 250, the reduced power communication processor 258, or a combination thereof may identify the received packet as being associated with a reduced power message. In a particular embodiment, the packet identified as including the reduce power message is provided to the reduced power communication processor 258 from the processor 250. In a particular embodiment, the processor 250 includes the reduced power communication processor 258.

The reduced power communication processor 258 may be configured to generate a control signal associated with the message. For example, the control signal may be an acknowledge (ACK) signal responsive to a signal (e.g., a packet or message) received from one of the STA 106 of the application server (not shown). The control signal may be transmitted by the transmitter of the transceiver 252.

The reduced power communication processor 258 may be configured to receive the packet associated with the reduced power message. For example, the reduced power communication processor 258 may support (e.g., maintain) an access network layer, such as the AP reduced power access network layer 114 of FIG. 1, that is used to detect the packet. The reduced power communication processor 258 may also be configured to generate (e.g., initiate or recreate) the message to be processed by the protocol layer based on the operand included in the packet (e.g., the packet that corresponds to a message initiated by the application 224 of the STA 106). For example, the protocol layer may be associated with a destination (e.g., the application server) other than (e.g., that is different from) a source (e.g., the STA 106) of the packet. As part of generating (e.g., initiating) the message, the message may be associated with a resource from the resource pool 268 stored in the memory 262. The resource pool 268 may include a pool of resources that are unassociated with the socket call. In a particular embodiment, the resource pool 268 includes one or more internet protocol (IP) IP addresses and the resource is a particular IP address selected from the one or more IP addresses.

The generated message may be provided to a transport layer stack (e.g., a transport protocol layer) to be formatted for transmission to an application server. For example, the processor 250 or the reduced power communication processor 258 may support (e.g., open and/or maintain) a transport protocol stack, such as the AP transport protocol stack 216. In a particular embodiment, the protocol stack includes a TCP/IP stack hosted by the AP 104 on behalf of the STA 106 and the message includes a TCP/IP message. For example, the AP 104 may initiate the TCP/IP stack in response to receiving a packet (e.g., a reduced power communication packet) that includes a connect operand from the STA 106. In a particular embodiment, the protocol stack may be opened and maintained by the processor 250.

The transceiver 252 may be configured to transmit the generated message (e.g., a socket call) formatted by the transport protocol layer to the application server. In response to receiving the message (e.g., the socket call), the application server may send a communication, such as a control signal or a response message (e.g., a message) directed to the application 224 of the STA 106 via the AP 104.

When the application server provides a control signal in response to the socket call, the receiver of the transceiver 252 may be configured to receive the control signal associated with the message transmitted to the application server and the transmitter of the transceiver 252 may be configured to transmit a response to the control signal. For example, the response to the control signal may be transmitted on behalf of the STA 106 without input of the STA 106.

When the application server provides the response message, the reduced power communication processor 258 may be configured to generate a packet based on the response message received. For example, the packet generated based on the response message may include a reduced power communication payload to be received by the STA 106. The packet (e.g., the packet generated based on the response message) may be transmitted to the STA 106 by the transmitter included in the transceiver 252.

The reduced power communication processor 258 may be configured to identify a previously generated packet awaiting transmission to the STA 106. The reduced power communication processor 258 may also be configured to compare an attribute of the packet (e.g., the packet generated based on the response message) with an attribute of the previously generated packet. The reduced power communication processor 258 may discard the second packet based on a determination that the attribute of the second packet matches the attribute of the previously generated packet. By discarding the packet when a match of a previously generated packet awaiting transmission is identified, the AP 104 may reduce an amount of packets (e.g., communicated to the STA 106). In a particular embodiment, the reduced power communication processor 258 may compare the previously generated packet to the current packet prior to the transmitter of the transceiver 252 initiating transmission of current packet (e.g., the generated socket call).

The memory 262 may include instructions 266 and a resource pool 268. The instructions 266 may be executable by the processor 250, the reduced power communication processor 258, or a combination thereof. The processor 250 may be configured to control operation of the AP 104 base on the instructions 266. For example, the processor 250 may be configured to perform logical and arithmetic operations based on instructions 266 (e.g., software) and data stored within the memory 262.

During operation, the processor 210 of the STA 106, based on the application 224, may initiate (e.g., generate) a socket call to a first protocol layer. For example, the socket call may be associated with an application server located remotely from the STA 106. The socket call may be intercepted and provided to a second protocol layer associated with the reduced power communication processor. A packet may be generated based on an operand associated with the socket call. For example, the packet may be generated using one of the processor 210, the reduced power communication processor 218, or a combination thereof. In a particular embodiment, the packet includes an operand associated with a socket call to the first protocol layer. The packet may be transmitted to the AP 104 via a media access control (MAC) layer of the STA 106 to enable the AP 104 to host a protocol stack for the first protocol layer of STA 106.

The AP 104 may receive the packet via a media access control (MAC) layer of the AP 104. The packet, or a portion thereof, may be provided to the reduced power communication processor 258 which may initiate, at the AP 104, the socket call to the first protocol layer based on the received packet. For example, the AP 104 may open and maintain a TCP/IP stack on behalf of the STA 106 to communicate with the application server. Using the TCP/IP stack, the AP 104 may communicate with the application server, including sending and receiving communications such as control signals, control signal responses, data packet, or combinations thereof. The AP 104 may also communicate with the STA 106 including sending and receiving communications such as control signals, control signal responses, data packet, or combinations thereof.

For example, the AP 104 may receive a message (e.g., a data packet) from the application server that is directed for the STA 106. The STA 106 may process the message received from the application server via the TCP/IP stack using the processor 250, the reduced power communication processor 258, or a combination thereof. The processed message may be provided to the reduced power communication processor 258 to generate a second message to be transmitted to the STA 106. The second message may be generated to be communicated via the second protocol layer that is different than the first protocol layer (e.g., the TCP/IP layer). In a particular embodiment, the second message includes a reduced power payload. For example, the second message may be generated using the processor 250, the reduced power communication processor 258, or a combination thereof.

The STA 106 may receive the second message and identify that the second message includes the reduced power payload. For example, the processor 210, the reduced power communication processor 218, or a combination thereof, may identify the reduced power payload included in the second message. The second message may be processed and data based on the processed second message may be provided to the application 224. For example, the processor 210, the reduced power communication processor 218, or a combination thereof, may process the second message and provide the data to the application 224.

Accordingly, the reduced power communication processor 218 of the STA 106 and the reduced power communication processor 258 of the AP 104 enable the AP 104 to support a transport protocol stack on behalf of the STA 106. Accordingly, a reduction of power expended by and traffic communicated between the AP 104 and the STA 106 may be realized.

Figure 3:
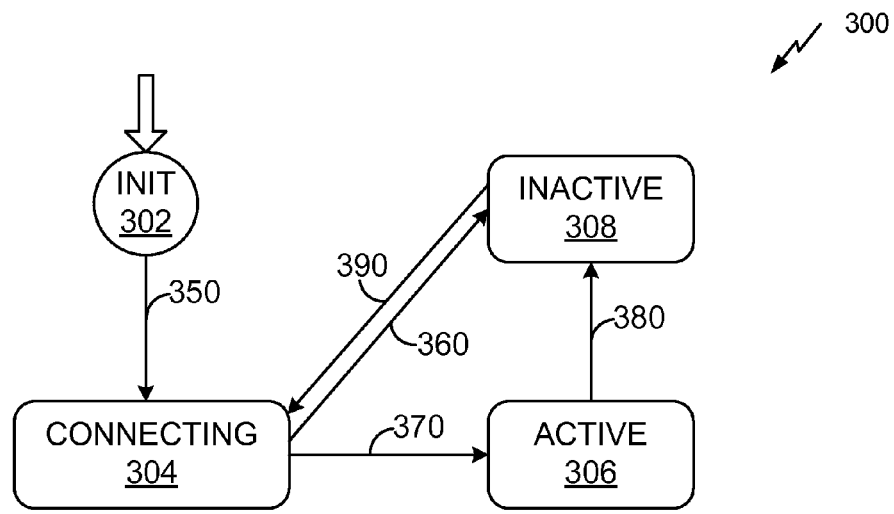
FIG. 3 is a diagram of an exemplary state transition diagram of a reduced power communication session.

Referring to FIG. 3, an exemplary state transition diagram of a reduced power communication session at a STA is shown and generally designated 300. For example, the STA may include the STA 106 of FIG. 1. The states of the STA included in the state transition diagram 300 may include an initialize state 302, a connecting state 304, an active state 306, and an inactive state 308.

A reduced power communication session begins in the initialize state 302. In the initialize state, the STA may include establishing a link with an AP, such as the AP 104 of FIG. 1, via a link layer. A transition 350 from the initialize state 302 to the connecting state 304 occurs when a socket connect request is generated from a client application. For example, the client application may include one of the client application 107 of FIG. 1 or the application 224 of FIG. 2.

During the connecting state 304, the socket is established with the AP and a corresponding socket connection is established between the AP and an application server (AS), such as the AS 102 of FIG. 1. Based on a determination that the connecting state 304 fails to establish a connection, a transition 360 to the inactive state 308 occurs.

The inactive state 308 is a state wherein the STA may be connected with the AP via the physical layer, but no further sockets or communications are possible. The STA may be configured to maintain an idle timer. For example, the idle timer may indicate a period of time for the STA to wait until attempting to try a connection via a transition 390. Transition 390 may also occur in response to the STA attempting to return to an active state after being idle.

In response to a determination that the connection state 304 succeeded in establishing a connection, a transition 370 to the active state occurs. During the active state the STA communicates with the AS via the established communication connection. When the STA falls idle (e.g., goes inactive), transition 380 to the inactive state may occur. The STA may be determined to be idle, for example, based on application traffic to or from the STA for a given client application.

Figure 4:
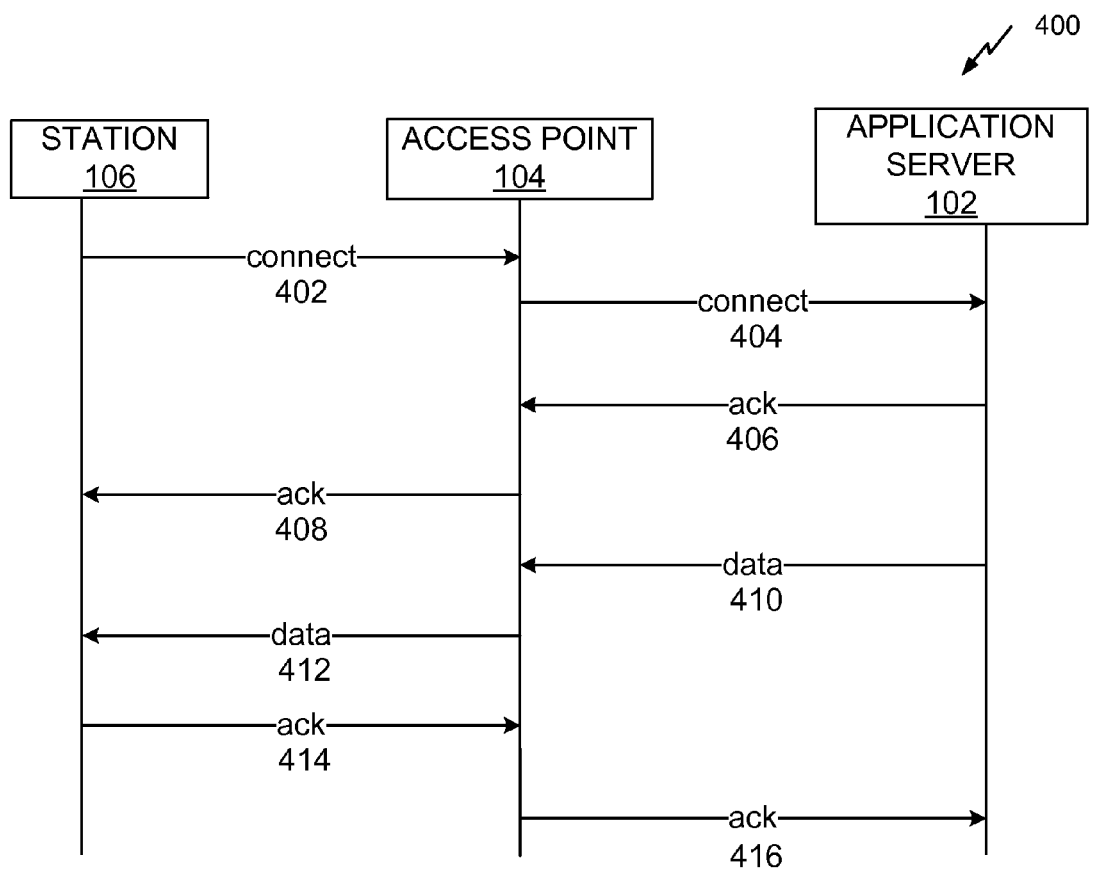
FIG. 4 is ladder diagram of message exchanges corresponding to an exemplary method of reduced power wireless communication.

FIG. 4 shows ladder diagram 400 including a message exchange for an illustrative process (e.g., a method) of reduced power wireless communication.

The STA 106 transmits a connect 402 message including a representation of the operand and parameters associated with the socket call to the AP 104. The socket call may be initiated by a client application associated with the STA 106. For example the client application may include one of the client application 107 of FIG. 1 or the application 224 of FIG. 2. The AP 104 decodes the connect 402 message and generates a transport protocol connect message 404 (e.g., TCP/IP connect). The message 404 is transmitted to the AS 102.

The AS 102 may acknowledge the successful connect with an acknowledge (ACK) message 406. The AP 104 may receive the ACK message 406 and encode the acknowledge message 406 into a reduce power acknowledge message 408 which is transmitted to the STA 106. In a particular embodiment, the AS 102 encodes the acknowledge message 406 into the reduced power acknowledge message to be transmitted to the STA 106.

The STA 106 may decode the acknowledgement message 408 and provide the data to the originating client application. As similar message exchange may be performed for other message originating from the STA 106. In a particular embodiment, the acknowledge message 406 includes response data, responsive to the socket call, which is processed as described above.

The AS 102 may push data to the STA 106. The push may be achieved via a data message 410. The data message 410 may be transmitted to AP 104. The AP 104 may then determine the appropriate AP-STA MAC PHY based on an IP address receiving the data message 410. For example, the AP-STA MAC PHY may include the AP-STA MAC PHY 112 of FIG. 1. The AP 104 may then encode the data message 410 as above and transmit the encoded message 414 via the identified AP-STA MAC PHY.

The AS 102 may expect an acknowledgement upon receipt of data message 410. In a first exemplary embodiment, the AP 104 may transmit an acknowledgement message 416 immediately upon successful receipt of the data message 410. In a second exemplary embodiment, the AP 104 may transmit the acknowledgement message 416 when the encoded data message 412 is transmitted to the STA 106. In a third exemplary embodiment, the AP 104 may wait for an acknowledgement message 414 from the STA 106 and transmit a decoded version of the acknowledgement message 414 as the acknowledgement message 416. One or more of the first thru third exemplary embodiments may be implemented in a given wireless communication system. For example, certain application traffic (e.g., data or messages initiated and/or associated with a client application) may require more robust control signaling. In these cases (e.g., requiring more robust control signaling), the AP 104 may to wait to send the acknowledgement message 416 until the acknowledgement message 414 is received from the STA 106.

Figure 5:
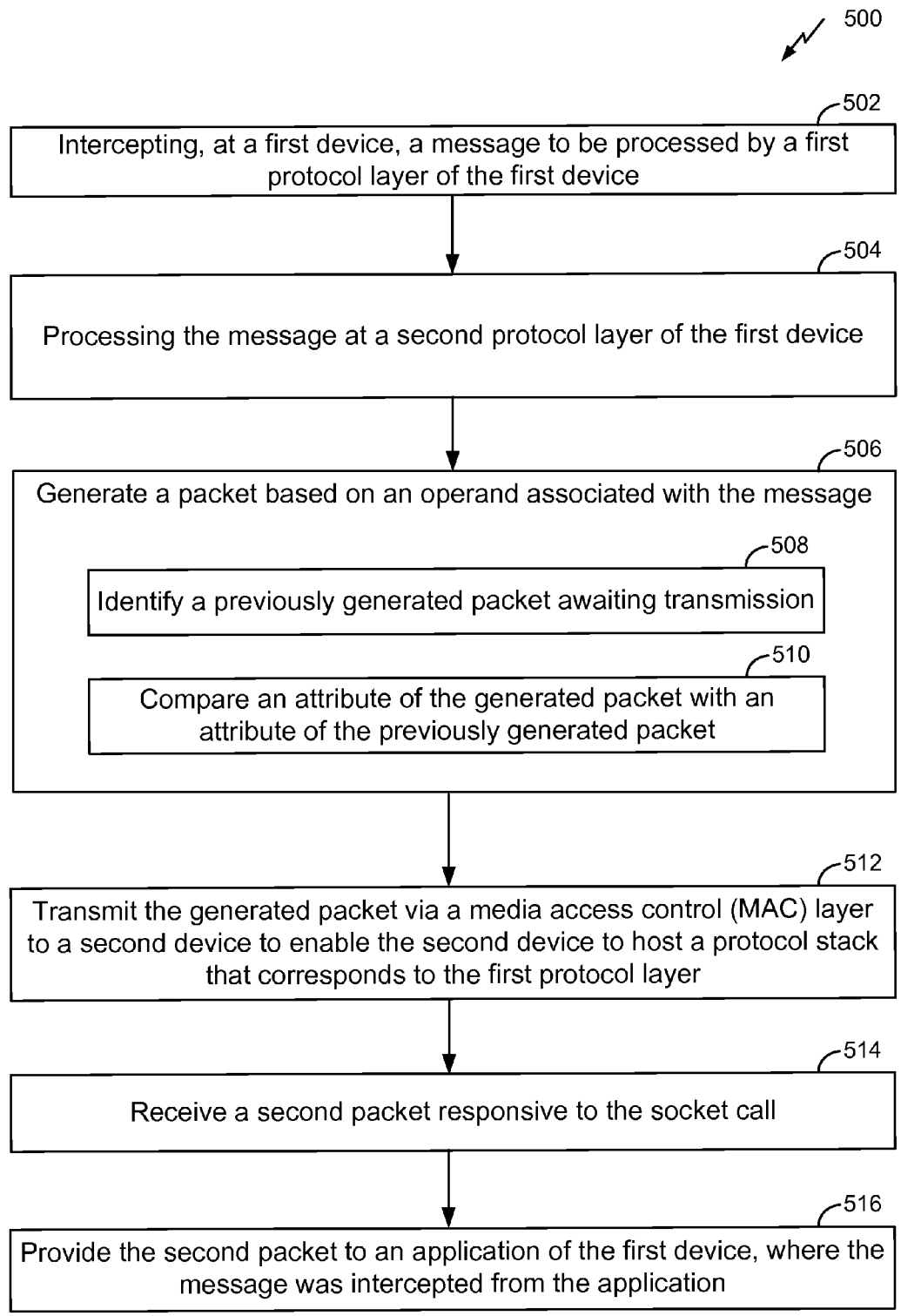
FIG. 5 is a flow diagram of an exemplary method of reduced power wireless communication.

Referring to FIG. 5, a flow diagram of a first illustrative embodiment of a method 500 for reduced power wireless communication is shown. In a particular embodiment, the method 500 may be performed by the station (STA) 106 of FIG. 1.

A message (e.g., a socket call) to be processed by a first protocol layer is intercepted at a first device, at 502. The first protocol layer may include a transmission control protocol (TCP)/Internet protocol (IP) layer. The interception may be transparently performed without any alterations to a client application connectivity procedure. The client application may have generated the socket call that is intercepted. For example, the client application may include one of the applications 124 of FIG. 1 or the client application 107 of FIG. 2 and the socket call may be intercepted by the processor 110, the encoder 114, the reduced power communication processor 118 of FIG. 1 or the STA reduced power access network layer 208 of FIG. 2.

The message (e.g., socket call) is processed at a second protocol layer, at 504. The second protocol layer may include a different layer than the first protocol layer, at 504. For example, the second protocol layer may include the STA reduced power access network layer 208 of FIG. 2 which may be opened and maintained by the processor 110 or the reduced power communication processor 118 of FIG. 1.

A packet is generated based on an operand associated with the message (e.g., socket call) and/or first device, at 506. The operand may be one of connect, bind, listen, accept, get host by name, or get host by address. During generation of the packet, at least a portion of information added by the client application connectivity procedure may be stripped. For example, information added in anticipation of transmission control protocol (TCP)/Internet protocol (IP) communication may not be needed for reduced power communication. For example, the packet may be generated by the processor 110, the encoder 114, the reduced power communication processor 118, the payload generator 120 of FIG. 1 or the STA reduced power access network layer 208 of FIG. 2.

Generating the packet may include identifying a previously generated packet awaiting transmission, at 508, and comparing an attribute of the generated packet with an attribute of the previously generated packet, at 510. In response to a determination that a comparison between the attribute of the generated packet and the attribute of the previously generated packet resulted in a match, the generated packet may be discarded. For example, identify the previously generated packet and comparing the attribute of the previously identified packet to the attribute of the generated packet may include the processor 110, the reduced power communication processor 118, the payload generator 120 of FIG. 1 or the STA reduced power access network layer 208 of FIG. 2.

The generated packet is transmitted via a media access control (MAC) layer to a second device to enable the second device to host a protocol stack that corresponds to the first protocol layer, at 512. Transmitting the generated packet may include transmitting the generated packet to a destination other than a destination of the intercepted socket call. In a particular embodiment, the generated packet may be transmitted to the AP 104 of FIG. 1 that is different than the STA 106 of FIG. 1 or the AS 202 of FIG. 2 associated with the socket call. For example, the generated packet may be transmitted via the transceiver 112 of FIG. 1 or the STA MAC PHY 210 of FIG. 2.

A second packet responsive to the socket call may be received, at 514, and The second packet may be provided to an application of the first device, the socket call being previously intercepted from the application, at 516. The second packet may include a reduced power communication received at the STA from the AP. For example, the second packet may be received the transceiver 112 of FIG. 1 or the STA MAC PHY 210 of FIG. 2 and provided to the application, such as the application 124 of FIG. 1 or the client application 107 of FIG. 2.

One particular advantage provided by the method 500 is an ability of the STA to delegate hosting of the TCP/IP stack to the AP. By delegating the TCP/IP stack to the AP, the STA may realize resource savings, such as processing time, battery power, and bandwidth, to support aspects (e.g., features) of the transport protocol stack that may not be applicable or important to the STA. In addition to delegating the TCP/IP stack, the STA may also reduce and amount of communications received by the STA by delegating one or more programming functions associated with maintaining the TCP/IP stack, e.g., responding to control signals, to the AP.

Figure 6:
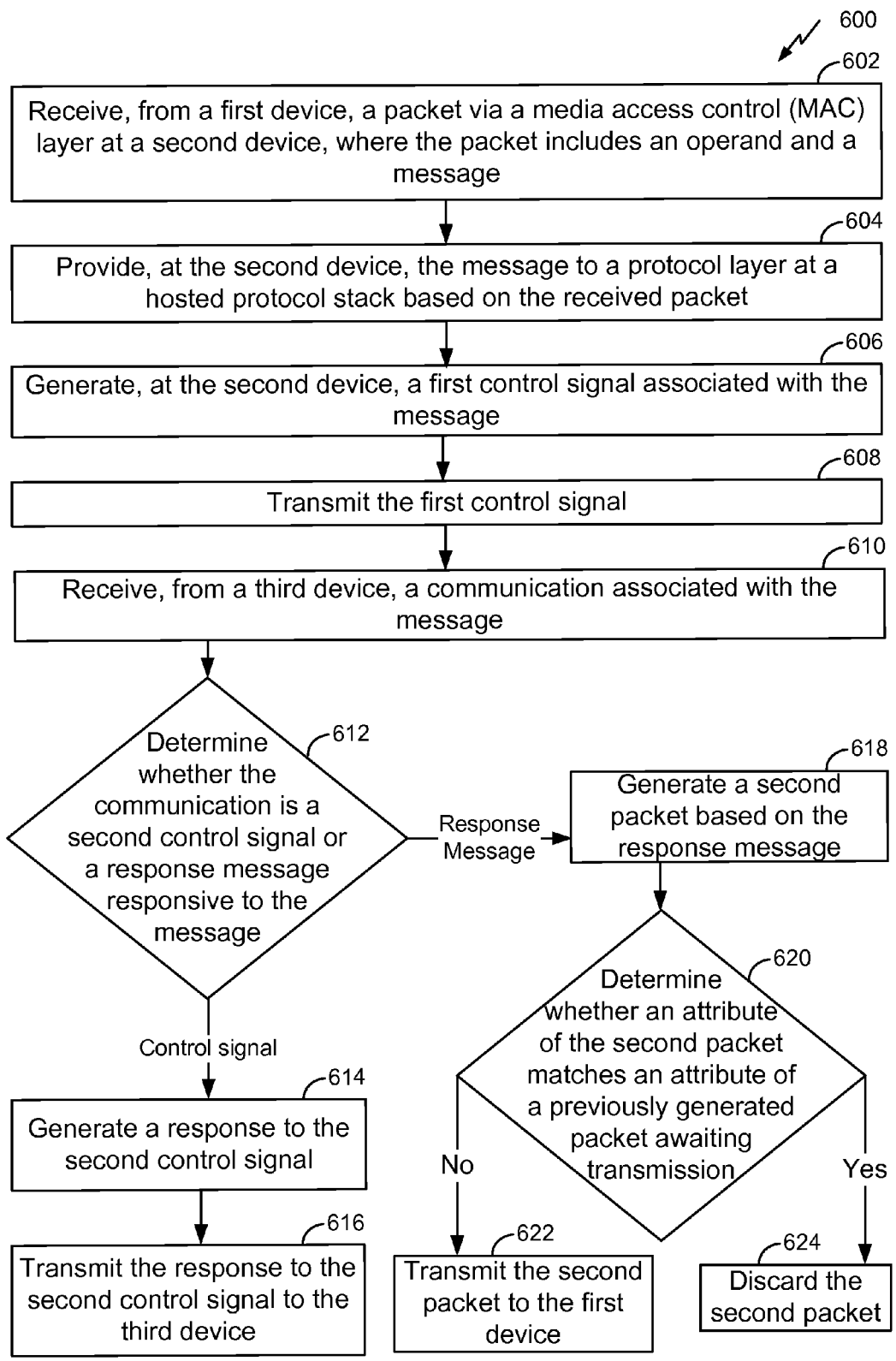
FIG. 6 is a flow diagram another exemplary method of reduced power wireless communication.

Referring to FIG. 6, a flow diagram of a second illustrative embodiment of a method 600 for reduced power wireless communication is shown. In a particular embodiment, the method 600 may be performed by the access point (AP) 104. Alternatively or in addition to, the functionality of the AP 104 may be performed by a station (STA), such as the STA 106 of FIG. 1. For example, the STA may perform the functionality of the AP 104 when the STA is included in a peer-to-peer network between multiple stations (STAs).

A packet is received from a first device via a media access control (MAC) layer at a second device, the packet including an operand and a message (e.g., a socket call), at 602. In a particular embodiment, the packet may include the operand but does not include any associated parameters. For example, the first device may include the STA 106 of FIG. 1 and the packet may be received via the transceiver 152 of FIG. 1 or the AP-STA MAC PHY 212 of FIG. 2.

The message is provided to a protocol layer at a hosted protocol stack based on the received packet, at 604. To illustrate, initiating a socket call may include decoding the operand and parameters included in the received packet. For example, the socket call may be initiated by the processor 150, the transceiver 152, the reduced power communication processor 158, the decoder 156, the payload generator 160 of FIG. 1 or the AP reduced power access network layer 214 of FIG. 2.

A first control signal associated with the message may be generated, at 606, and the first control signal may be transmitted, at 608. For example, the first control signal may be generated by the processor 150, the transceiver 152, the reduced power communication processor 158, the encoder 154, the payload generator 160 of FIG. 1 or the AP reduced power access network layer 214 of FIG. 2.

A communication associated with the message may be received, at 610. For example, the communication may be received via the transceiver 152 of FIG. 1 or the AP-AS MAC PHY 218 of FIG. 2. A determination whether the communication is a second control signal or a response message responsive to the message may be made, at 612. For example, the determination may be made by the transceiver 152, the processor 150, the decoder 156, the reduced power communication processor 158 of FIG. 1, the AP transport protocol stack 216 or the AP reduced power access network layer 214 of FIG. 2. Where the communication is determined to be the second control signal, a response to the second control signal may be generated, at 614. The response to the second control signal may be transmitted to the third device, at 616.

Where the communication is instead determined to be the message, a second packet may be generated based on the response message, at 618. For example, the second packet may be generated by the processor 150, the encoder 154, the reduced power communication processor 158, the payload generator 158 of FIG. 1, or AP reduced power access network layer 214 of FIG. 2.

A determination whether an attribute of the second packet matches an attribute of a previously generated packet awaiting transmission may be made, at 620. For example, may be made by the processor 150, the reduced power communication processor 158, the payload generator 160 of FIG. 1 or the AP reduced power access network layer 214 of FIG. 2. Where the attribute of the second packet is determined to match the attribute of the previously generated packet, the second packet is transmitted to the first device, at 622. Where the attribute of the second packet is instead determined to match the attribute of the previously generated packet, the second packet may be discarded, at 624.

Accordingly, the method 600 enables the AP to host a transport protocol stack (e.g., a TCP/IP stack) on behalf of the STA. The AP may perform one or more programming functions associated with maintaining the TCP/IP stack on behalf of the STA. For example, the AP may perform programming to include a series of packet headers in transmitted messages, parse header fields of received messages, and to monitor for and respond to various control signals (e.g., address resolution protocol (ARP) signaling, TCP keep alive signaling, and discovery protocols message, such as UPnP, Bonjour, etc.). Performing such programming (e.g., functions) by the AP may enable the STA to realize resource savings, such as processing time, battery power, and bandwidth, to support aspects (e.g., features) of the transport protocol stack that may not be applicable or important to the STA.

One of ordinary skill in the art should understand that methods, such as the method 500 of FIG. 5 and the method 600 of FIG. 6, described herein are merely illustrative. One or more of the steps of the methods (e.g., processes) may be removed, additional steps may be added, the order of steps changed, or combinations thereof, while still remaining consistent with the disclosure herein.

The method the method 500 of FIG. 5, the method 600 of FIG. 6, or any combination thereof, may be implemented or otherwise performed by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 500 of FIG. 5, the method 600 of FIG. 6, or any combination thereof, can be initiated by a processor (e.g., a processor 704 or a processor 740) that executes instructions stored in the memory 706, as described with respect to FIGS. 7-10.

Figure 7:
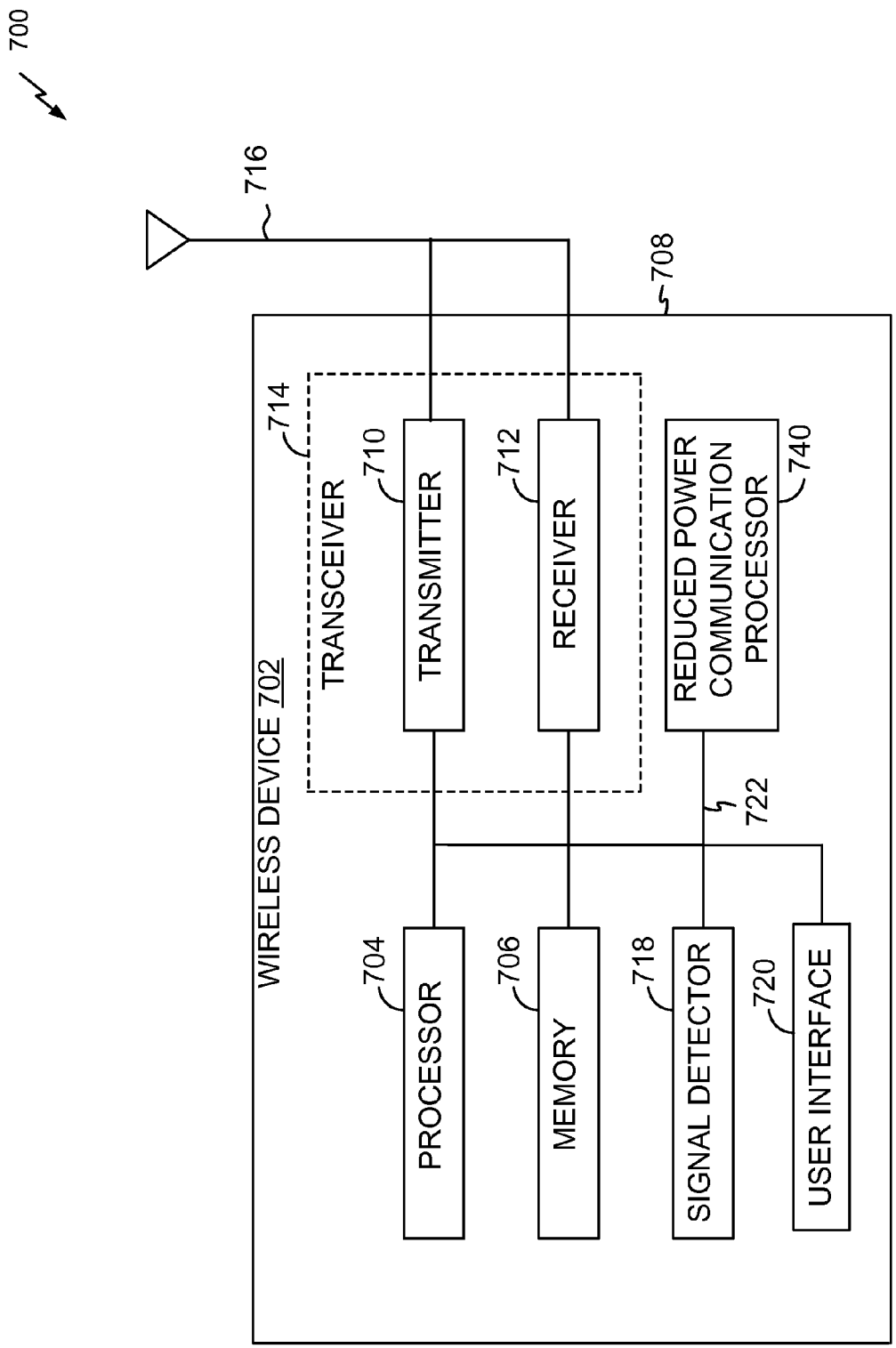
FIG. 7 is a block diagram of a device operable for use in a reduced power wireless communication system.

FIG. 7 is a diagram to illustrate a system 700 that includes a wireless device 702 that may be employed within the system 100 of FIG. 1 or the system 200 of FIG. 2. The wireless device 702 is an example of a device that may be configured to implement the various methods, such as the methods of FIGS. 5-6, described herein. The wireless device 702 may include the STA 106 or the AP 104 FIGS. 1-2.

The wireless device 702 may include various components, such one or more processors 704, a memory 706, a signal detector 718, a user interface 722, a transceiver 714, and a reduced power communication processor 740. The wireless device 702 may also include a housing 708 that includes a transmitter 710 and a receiver 712. The transmitter 710 and the receiver 712 may be included in the transceiver 714. The various components of the wireless device 702 may be coupled together via a bus system 722. The bus system 722 may include a power bus, a control signal bus, a status signal bus, a data bus, or a combination thereof. Those of skill in the art will appreciate the components of the wireless device 702 may be coupled together or accept or provide inputs to each other using a mechanism other than the bus system 722.

The one or more processors 704 may control operation of the wireless device 702. The one or more processors 704 may also be referred to as a central processing unit (CPU). Memory 706, which may include read-only memory (ROM), random access memory (RAM), or a combination thereof, may provide instructions and/or data to the one or more processors 704. A portion of the memory 706 may also include non-volatile random access memory (NVRAM). The processors 704 may perform logical and arithmetic operations based on program instructions stored within the memory 706 or another memory (not shown) external to the wireless device 702. The instructions in the memory 706 may be executable to implement the methods described herein, such as the methods of FIGS. 5-6. Further, the memory 706 may include (e.g., store) software that is executable by either of the processor 704 and/or the reduced power communication processor 740. In a particular embodiment, the one or more processors 704 and the reduced power communication processor 740 may be included in a single processor configured to perform one or more functions of each of the processors 704 and the reduced power communication processor 740. In a particular embodiment, the wireless device 702 is implemented such that the one or more processors 704 are configured to utilize the reduced power communication processor 740.

The one or more processors 704 may be implemented as a general-purpose microprocessor, a microcontroller, a digital signal processor (DSP), a field programmable gate array (FPGA), a programmable logic devices (PLD), a controller, a state machine, gated logic, discrete hardware components, dedicated hardware finite state machines, any other suitable entities that can perform calculations or other manipulations of information, or a combination thereof. In a particular embodiment, the one or more processors 704 include a DSP that is configured to generate a packet (e.g., a data packet) for transmission. For example, the packet may include a physical layer data unit (PPDU).

The transmitter 710 and the receiver 712 may allow transmission and reception of data between the wireless device 702 and a remote location. The transmitter 710 and the receiver 712 may be combined into a transceiver 714. An antenna 716 may be attached to the housing 708. The antenna 716 may be electrically coupled to the transceiver 714. The wireless device 702 may also include (not shown) multiple transmitters, multiple receivers, and multiple transceivers. In a particular embodiment, the transceiver 714 may be included in a wireless interface (not shown) that is coupled to the processor 704 and/or the DSP 720. The transmitter 710 may be configured to wirelessly transmit packets and/or signals. For example, the transmitter 710 may be configured to transmit different types of packets generated by the processors 704 or the reduced power communication processor 740. The packets may be made available to the transmitter 710. For example, the reduced power communication processor 740 may store a packet in the memory 706 and the transmitter 701 may be configured to retrieve the packet. The transmitter 710 may wirelessly transmit the packet via the antenna 716. In a particular embodiment, the transmitter 710 buffers or queues the packet/signals prior to transmission.

An antenna 716 of the wireless device 702 detects the transmitted packets (e.g., signals). The receiver 712 may be configured to process the detected packets and make the detected packets available to the processors 704 or the reduced power communication processor 400. For example, the receiver 712 may store the packet in memory 706 and the reduced power communication processor 400 may be configured to retrieve the packets for further processing.

The signal detector 718 may be used to detect and quantify a level of signals received via the transceiver 714. For example, the signal detector 718 may detect a total energy, an energy per subcarrier per symbol, a power spectral density, and other signals.

The wireless device 702 may also include a user interface 720. The user interface 720 may include a keypad, a microphone, a speaker, a display, or a combination thereof. The user interface 720 may include any element or component that conveys information to a user (e.g., an operator) of the wireless device 702 and/or receives input from the user. The wireless device 702 may also include a housing 708 surrounding one or more of the components included in the wireless device 702.

In an exemplary embodiment, the processor 704 or the reduced power communication processor 740 may be configured to execute processor-executable instructions (e.g., computer executable instructions) stored at a non-transitory computer-readable medium, such as the memory 706, and the processor-executable instructions are executable to cause a computer, such as the processor 704 or the reduced power communication processor 740, to intercept a message to be processed by a first protocol layer of a first device and to process the message at a second protocol layer of the first device. The processor-executable instructions are further executable to cause the computer, such as the processor 704 or the reduced power communication processor 740, to generate a packet based on an operand of the message. The processor-executable instructions are further executable to cause the computer, such as the processor 704 or the reduced power communication processor 740, to initiate a transmission of the generated packet to a second device via a media access control (MAC) layer to enable the second device to host a protocol stack that includes the first protocol layer.

In another exemplary embodiment, the processor 704 or the reduced power communication processor 740 may be configured to execute processor-executable instructions (e.g., computer executable instructions) stored at a non-transitory computer-readable medium, such as the memory 706, and the processor-executable instructions are executable to cause a computer, such as the processor 704 or the reduced power communication processor 740, to receive a packet via a media access control (MAC) layer, the packet including an operand for a message to a protocol layer. The processor-executable instructions are further executable to cause the computer, such as the processor 704 or the reduced power communication processor 740, to provide the message to the protocol layer based on the received packet.

The wireless device 702 may include one or more optional components (not shown). For example, the wireless device may include a display controller. The display controller may be coupled to the processor 704, the reduced power communication processor 740, the bus system 722, the user interface 720, or a combination thereof. The display controller may be coupled to a display device included in or external to the wireless device 702. The wireless device 702 may also include a coder/decoder (CODEC) that can also be coupled to the processor 704, the reduced power communication processor 740, the bus system 722, the user interface 720, or a combination thereof. A speaker and a microphone can be coupled to the CODEC.

In a particular embodiment, the processor 704, the reduced power communication processor 740, the memory 706, the wireless transceiver 714, and the signal detector 718 are included in a system-in-package or system-on-chip device included in the wireless device 702. In a particular embodiment, an input device and a power supply are coupled to the system-on-chip device. Moreover, in a particular embodiment, the display device, the input device, the speaker, the microphone, the antennas 716, and the power supply are external to the system-on-chip device. However, each of the display device, the input device, the speaker, the microphone, the antennas 716, and the power supply can be coupled to a component of the system-on-chip device of the wireless device 702, such as an interface or a controller.

Figure 8:
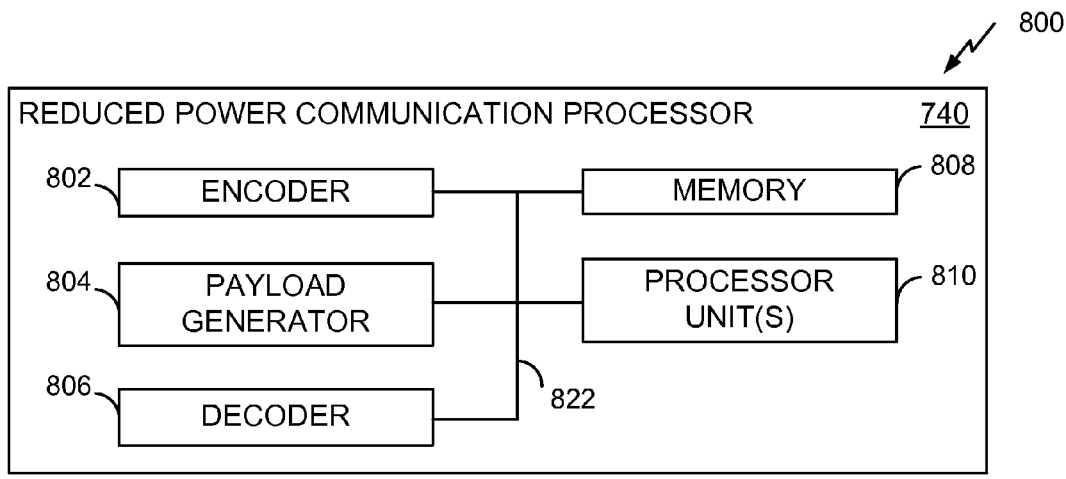
FIG. 8 is a diagram that illustrates a first particular embodiment of a reduced power communication processor that may be employed within the device of FIG. 7.
Figure 9:
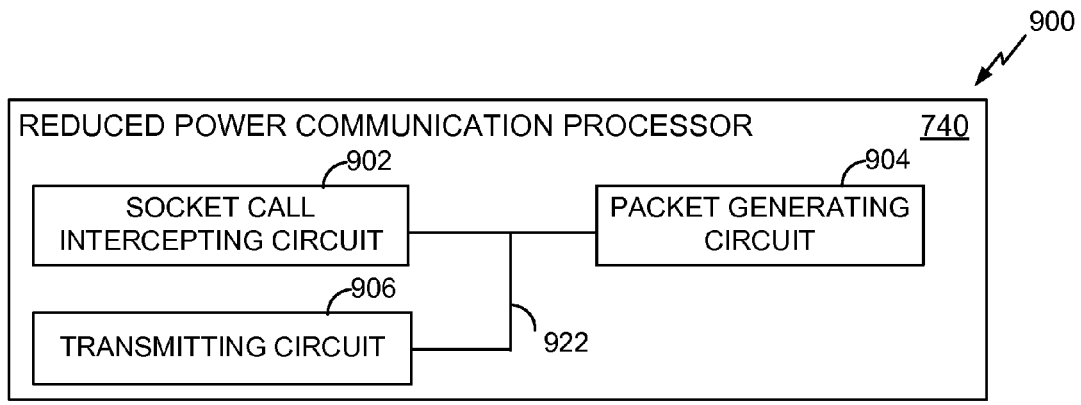
FIG. 9 is a diagram that illustrates a second particular embodiment of a reduced power communication processor that may be employed within the device of FIG. 7.
Figure 10:
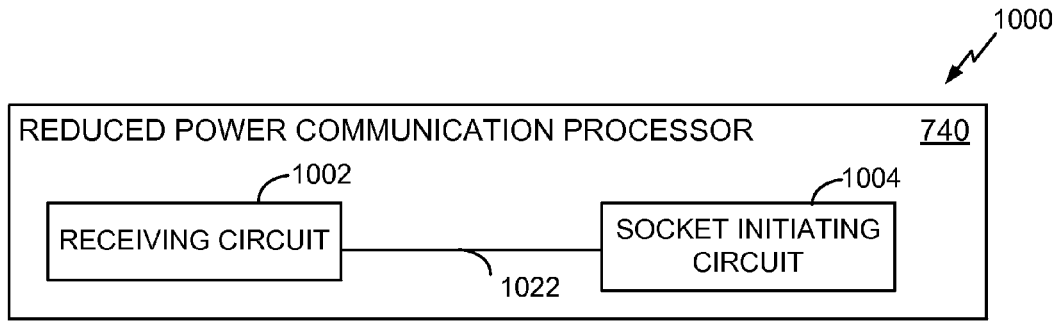
FIG. 10 is a diagram that illustrates a third particular embodiment of a reduced power communication processor that may be employed within the device of FIG. 7.

FIGS. 8-10 each illustrate exemplary embodiments of the reduced power communication processor. For example, the reduced power communication processor may include the reduced power communication processor 118, 158 of FIG. 1 or the reduced power communication processor 740 of FIG. 7.

Referring to FIG. 8, a first illustrative embodiment of a system 800 including the reduced power communication processor 740. The reduced power communication processor 400 may include an encoder 802, a payload generator 804, a decoder 806, a memory 808, and one or more processor units 810.

The encoder 802 may be configured to encode a network communication (e.g., socket communication) into a reduced power communication (e.g., a format that utilizes a fewer number of bits than the network communication). For example, a client application, such as the client application 107 of FIG. 1 or the application 224 of FIG. 2, may generate a connect request (e.g., a socket connect request to establish a communication channel with an application server, such as the application server 102 of FIG. 1). The encoder 802 may be configured to perform a translation of the connect request along with one or more associated operands into a reduced power format (e.g., a reduced power format that utilizes fewer bits than a traditional request, such as a traditional socket request). For example, the encoder 802 may intercept the connect request including several parameters and generate a single datagram representing the operand (e.g., connect) and the associated parameters. Other operands that may be included in a network communication (e.g., a request) may include bind, listen, accept, get host by name, and get host by address.

The payload generator 804 may be configured to construct a data payload for transmission based on one or more encoded messages. For example, the payload generator 804 may concatenate multiple messages into a single payload when adequate bandwidth is available for both messages. The payload generator 804 may also compress or otherwise optimize the encoded message. For example, the payload generator 804 may identify a message awaiting transmission (e.g., buffered or queued at a transmitter of a transceiver associated with the reduced power communication processor 704) having an attribute (e.g., an operand or a parameter) in common with a message currently being processed. In this case, the payload generator 804 may discard the message currently being processed. In a particular embodiment, the function of the payload generator 804 and the encoder 802 may be combined in a single unit.

The decoder 806 may be configured to decode a packet received at the reduced power communication processor 740 having a reduced power format into a transport protocol format. For example, the decoder 806 may be configured to identify an IP address associated with a given reduced power packet. The decoder 806 may identify the IP address by consulting a look up table mapping an IP address to an AP-STA MAC PHY stored in a memory 808. For example the AP-STA MAC PHY may include the AP-STA MAC PHY 112 of FIG. 1 and the memory may include the memory 262 including the resource pool 268 of FIG. 2. When no entry exists in the look up table, the decoder 806 may determine that the received packet is associated with a connect request. When the received packet is associated with the connect request, the decoder 806 may be configured to initiate a transport protocol stack, such as the AP transport protocol stack 116, associated with a device that transmitted the packet and to generate an entry in the lookup table including the IP address.

The one or more processor unit(s) 810 may be configured to control operations of the reduced power communication processor 740. The one or more of the processor unit(s) 810 may be collectively referred to as a central processing unit (CPU). Memory 808, which may include both read-only memory (ROM) and random access memory (RAM), provides instructions and data to the processor unit(s) 810. A portion of the memory 810 may also include non-volatile random access memory (NVRAM). The processor unit(s) 810 may be configured to perform logical and arithmetic operations based on program instructions stored within the memory 808. The instructions in the memory 808 may be executable to implement the methods described herein.

Each element of the reduced power communication processor 800 may be coupled via a bus system 812. The bus system 812 may include a data bus, a power bus, a control signal bus, a status signal bus, or a combination thereof. Those of skill in the art will appreciate the components of the reduced power communication processor 800 may be coupled together or accept or provide inputs to each other using some other mechanism.

Referring to FIG. 9, a second illustrative embodiment of a system 900 including the reduced power communication processor 740. Those of skill in the art will appreciate that the reduced power communication processor 740 may have more components than the reduced power communication processor 740 illustrated in the system 900 of FIG. 9. The reduced power communication processor 740 may include a socket call intercepting circuit 902, a packet generating circuit 904, and a transmitting circuit 906. The socket call intercepting circuit 902 may be configured to intercept a socket call such as a connect call. In a particular embodiment, means for intercepting includes a socket call intercepting circuit 902. The packet generating circuit 904 may be configured to generate a data packet based on the intercepted socket call. In a particular embodiment, means for generating includes a packet generating circuit 904. The transmitting circuit 906 may be configured to transmit the generated data packet. In a particular embodiment, means for transmitting the data packet includes the transmitting circuit 906.

Referring to FIG. 10, a third illustrative embodiment of a system 1000 including the reduced power communication processor 740. Those of skill in the art will appreciate that the reduced power communication processor 740 may have more components than the simplified reduced power communication processor 740 of the system 1000 of FIG. 10. The processor 1000 may include a receiving circuit 1002 and a socket initiating circuit 1004. The receiving circuit 1002 may be configured to receive a packet including an operand and parameters for a socket call. In a particular embodiment, means for receiving may include the receiving circuit 1002. The socket initiating circuit 1004 may be configured to initiate a socket call based on the received packet. In a particular embodiment, means for initiating may include a socket initiating circuit 1004.

In conjunction with one or more of the described embodiments, an apparatus is disclosed that may include means for intercepting, at a first device, a message to be processed by a first protocol layer of the first device. The means for intercepting may include the STA reduced power access network layer 108 of FIG. 1, the processor 210, the reduced power communication processor 218, the processor 250, the reduced power communication processor 258 of FIG. 2, the processor 704, the reduced power communication processor 740 of FIG. 7, the encoder 802, the processor unit 810 of FIG. 8, or the socket call intercepting circuit 902 of FIG. 9, one or more other devices or circuits configured to intercept the message to be processed by the first layer, or any combination thereof.

The apparatus may also include means for processing the message at a second protocol layer of the first device. The means for processing may include the STA reduced power access network layer 108 of FIG. 1, the processor 210, the reduced power communication processor 218, the processor 250, the reduced power communication processor 258 of FIG. 2, the processor 704, the reduced power communication processor 740 of FIG. 7, the encoder 802, the processor unit 810 of FIG. 8, or the socket call intercepting circuit 902 of FIG. 9, one or more other devices or circuits configured to process the message at the second layer of the first device, or any combination thereof.

The apparatus may also include means for generating a packet based on an operand of the message. The means for generating may include the STA reduced power access network layer 108 of FIG. 1, the processor 210, the reduced power communication processor 218, the processor 250, the reduced power communication processor 258 of FIG. 2, the processor 704, the reduced power communication processor 740 of FIG. 7, the encoder 802, the processor unit 810 of FIG. 8, or the packet generating circuit 904 of FIG. 9, one or more other devices or circuits configured to generate a packet, or any combination thereof.

The apparatus may also include means for transmitting the generated packet via a media access control (MAC) layer so as to enable a second device to host a protocol stack that includes the first protocol layer. The means for transmitting may include the STA MAC PHY 110, the AP-STA MAC PHY 112 of FIG. 1, the transceiver 212, the transceiver 252 of FIG. 2, the transmitter 710, the transceiver 714 of FIG. 7, the transmitting circuit 906 of FIG. 9, one or more other devices or circuits configured to transmit the generated packet via the MAC layer, or any combination thereof.

The apparatus may also include means for receiving a second packet responsive to the message. The means for receiving may include the STA MAC PHY 110, the AP-STA MAC PHY 112 of FIG. 1, the transceiver 212, the transceiver 252 of FIG. 2, the receiver 712, the transceiver 714 of FIG. 7, the receiving circuit 1002 of FIG. 10, one or more other devices or circuits configured to receive the second packet responsive to the message, or any combination thereof.

In conjunction with one or more of the described embodiments, another apparatus is disclosed that may include means for receiving, from a first device, a packet via a media access control (MAC) layer, the packet including an operand associated with a first message to a protocol layer. The means for receiving the packet may include the STA MAC PHY 110, the AP-STA MAC PHY 112 of FIG. 1, the transceiver 212, the transceiver 252 of FIG. 2, the receiver 712, the transceiver 714 of FIG. 7, the receiving circuit 1002 of FIG. 10, one or more other devices or circuits configured to receive the packet via the MAC layer, or any combination thereof.

The apparatus may also include means for providing the first message to the protocol layer based on the received packet. The means for providing may include the AP reduced power access network layer 114 of FIG. 1, the processor 210, the reduced power communication processor 218, the processor 250, the reduced power communication processor 258 of FIG. 2, the processor 704, the reduced power communication processor 740 of FIG. 7, the decoder 806, the processor unit 810, the socket initiating circuit 1004 of FIG. 10, one or more other devices or circuits configured provide the message to the protocol layer based on the received packet, or any combination thereof.

The apparatus may also include means for receiving a communication associated with the first message from an application server. The means for receiving may include AP-AS MAC PHY 118 of FIG. 1, the transceiver 212, the transceiver 252 of FIG. 2, the receiver 712, the transceiver 714 of FIG. 7, the receiving circuit 1002 of FIG. 10, one or more other devices or circuits configured to receive a communication, or any combination thereof.

The apparatus may also include means for determining whether the communication is one of a control signal or a second message. The means for determining may include the AP transport protocol stack 116 of FIG. 1, the processor 210, the reduced power communication processor 218, the processor 250, the reduced power communication processor 258 of FIG. 2, the processor 704, the reduced power communication processor 740 of FIG. 7, the decoder 808, the processor unit 810 of FIG. 8, the receiving circuit 1002 of FIG. 10, one or more other devices or circuits configured to determine whether the communication is one of the control signal or the second message, or any combination thereof.

The apparatus may also include means for generating a response to the control signal in response to a determination that the communication is the control signal. The means for generating may include the AP transport protocol stack 116 of FIG. 1, the processor 210, the reduced power communication processor 218, the processor 250, the reduced power communication processor 258 of FIG. 2, the processor 704, the reduced power communication processor 740 of FIG. 7, the encoder 802, the processor unit 810, one or more other devices or circuits configured to generate the response, or any combination thereof.

The apparatus may also include means for transmitting the response to the control signal to the application server. The means for transmitting may include AP-AS MAC PHY 118 of FIG. 1, the transceiver 212, the transceiver 252 of FIG. 2, the transmitter 710, the transmitter 714 of FIG. 7, the transmitting circuit 906 of FIG. 9, one or more other devices or circuits configured to transmit the response, or any combination thereof.

The apparatus may also include means for generating a second packet based on the second message in response to a determination that the communication is the second message. The means for generating may include the AP reduced power access network layer 114, the AP transport protocol stack 116 of FIG. 1, the processor 210, the reduced power communication processor 218, the processor 250, the reduced power communication processor 258 of FIG. 2, the processor 704, the reduced power communication processor 740 of FIG. 7, the encoder 802, the processor unit 810, the packet generating circuit 904 one or more other devices or circuits configured to generate the second packet, or any combination thereof.

The apparatus may also include means for transmitting the second packet to the application server. The means for transmitting may include AP-AS MAC PHY 118 of FIG. 1, the transceiver 212, the transceiver 252 of FIG. 2, the transmitter 710, the transmitter 714 of FIG. 7, the transmitting circuit 906 of FIG. 9, one or more other devices or circuits configured to transmit the second packet, or any combination thereof.

The apparatus may also include means for maintaining a pool of resources unassociated with a corresponding message, wherein providing the message includes associating a resource from the pool of resources with the message. The means for receiving the control signal may include processor 210, the reduced power communication processor 218, processor 250, the reduced power communication processor 258 of FIG. 2, processor 704, the reduced power communication processor 740 of FIG. 7, the processor unit 810 of FIG. 10, one or more other devices or circuits configured to receive the control signal associated with the socket call, or any combination thereof.

One or more of the disclosed embodiments may be implemented in a system or an apparatus, such as the device 700, that may include a communications device, a fixed location data unit, a mobile location data unit, a mobile phone (e.g., a smartphone), a cellular phone, a television, an access point, a computer, a tablet, a portable computer (e.g., a laptop computer), or a desktop computer. Additionally, the system or the apparatus may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, a gaming device or system, navigation devices, fixed location data units such as meter reading equipment, or any other device that stores or retrieves data or computer instructions, or any combination thereof. Although one or more of FIGS. 1-10 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

The device 700 may be included in a wireless communication system, such as the wireless communication system 100 of FIG. 1 and the wireless communication system 200 of FIG. 2 that operates pursuant to a wireless standard, such as Institute of Electrical and Electronics Engineers (IEEE) 802.11ah standard. A variety of techniques and/or protocols may be used to enable communication in the wireless communication system between an access point, such as the AP 104 of FIG. 1, and a station, such as the STA 106 of FIG. 1. The techniques described herein may be used in combination with various wireless technologies such as code division multiple access (CDMA), orthogonal frequency division multiplexing (OFDM), time division multiple access (TDMA), and so on. Multiple user terminals (e.g., stations) can concurrently transmit and receive data via different orthogonal code channels for CDMA, time slots for TDMA, or sub-bands for OFDM. A CDMA system may implement IS-2000, IS-95, IS-856, Wideband-CDMA (W-CDMA), or some other standard. An OFDM system may implement one or more IEEE 802.11 standards or some other standards. A TDMA system may implement global system for mobile communications (GSM) standards or some other standards. Additionally, the various wireless technologies may include various types of wireless local area networks (WLANs). A WLAN may be used to interconnect nearby devices together, employing widely used networking protocols. For example, the various aspects described herein may be used as part of the IEEE 802.11ah protocol, which uses sub-1 gigahertz (GHz) bands. As another example, the various aspect describe herein may be used in conjunction with a 6-9 GHz wireless network.

In a particular embodiment, one or more signals (e.g., data) are sent and received between the AP and station (STAs) of the wireless communication system in accordance with orthogonal frequency division multiplexing (OFDM)/orthogonal frequency division multiple access (OFDMA) techniques (e.g., an OFDM/OFDMA system). In another particular embodiment, one or more signals are sent and received between the AP and the STAs in accordance with code division multiple access (CDMA) techniques (e.g., a CDMA system).

Wireless signals in a sub-gigahertz band may be transmitted, for example, according to an IEEE 802.11ah protocol.

Transmission may use orthogonal frequency-division multiplexing (OFDM), direct-sequence spread spectrum (DSSS) communications, a combination of OFDM and DSSS communications, or other schemes. Implementations of the IEEE 802.11 ah protocol or other sub-gigahertz protocols may be used for sensors, metering, and smart grid networks. Devices implementing such protocols may consume less power than devices implementing other wireless protocols and may be used to transmit wireless signals across a relatively long range, for example about one kilometer or longer. Implementations of other protocols (e.g., 6-9 GHz protocols) may provide for a relatively shorter range of communication, such as approximately three or four meters.

Wireless networks may operate in several modes, such as an infrastructure mode or an ad-hoc mode. During operation in the infrastructure mode, a STA, such as the STA 106 of FIG. 1, may connect to an AP, such as the AP 104 of FIG. 1, that serves as a hub for connecting one or more wireless clients (e.g., one or more STAs) to the network infrastructure (e.g., the Internet). A wireless device (e.g., a client or a station (STA)) associated with an infrastructure network may be referred to as an associated STA. In the infrastructure mode, the wireless network may use a client-server architecture to provide connectivity to one or more wireless clients. During the ad-hoc mode, one or more wireless clients may establish direct connections to each other in a peer-to-peer architecture. In one aspect, an AP may generate a periodic beacon signal which broadcasts wireless network characteristics (e.g., a maximum data rate, an encryption status, an AP media access control (MAC) address, a service set identifier (SSID), etc.) to nearby clients (e.g., STAs). For example, the SSID may identify a particular wireless network.

A wireless local area network (WLAN) may include includes various devices, such as the AP and the STA (e.g., a client). In general, the AP serves as a hub or base station for the WLAN and the STA serves as a user of the WLAN. For example, an STA may be a laptop computer, a personal digital assistant (PDA), a mobile phone, etc. In an example, the STA connects to the AP via a wireless fidelity (Wi-Fi) (e.g., an IEEE 802.11 protocol such as 802.11ah) compliant wireless link to obtain general connectivity to the Internet or to other wide area networks. In a particular embodiment, the STA may also be used as an AP.

The AP, such as the AP 104 of FIG. 1, may include, be implemented as, or known as a NodeB, a radio network controller (RNC), an eNodeB, a base station controller (BSC), a base transceiver station (BTS), a base station (BS), a transceiver function (TF), a radio router, a radio transceiver, or some other terminology.

The STA, such as the STA 106, may also include, be implemented as, or be known as an access terminal (AT), a subscriber station, a subscriber unit, a mobile station, a remote station, a remote terminal, a user terminal, a user agent, a user device, user equipment, or some other terminology. For example, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem.

The AP may provide wireless communication coverage in a basic service area (BSA). The AP and the STA may be referred to as a basic service set (BSS) when the STA is associated with the AP and configured to use the AP for communication. In a particular embodiment, the wireless communication system, such as the wireless communication system 100 of FIG. 1 and the wireless communication system of FIG. 2, may not have a central AP, but rather may function as a peer-to-peer network between multiple stations (STAs). Accordingly, the functions of the AP described herein may alternatively be performed by one or more STAs, such as the STA 106 of FIG. 1.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, and circuits steps have been described above generally in terms of their functionality. Whether such functionality is implemented as hardware or processor executable instructions depends upon the particular application and design constraints imposed on the overall system. Additionally, the various operations of methods described above may be performed in any order and by any suitable means capable of performing the operations, such as various hardware and/ or software component(s), circuits, and/or module(s). Generally, any operations illustrated with respect to the FIGS. 1-10 may be performed by corresponding functional means capable of performing the operations. Skilled artisans may implement the described functionality in varying ways for each particular application, but such implementation decisions should not be interpreted as causing a departure from the scope of the present disclosure.

Those of skill would further appreciate that the various illustrative logical blocks, configurations, modules, circuits, and algorithm steps described in connection with the embodiments disclosed herein may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components (e.g. electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on as one or more instructions or code on a computer-readable medium. Computer-readable media includes computer-readable storage media and communication media including any medium that facilitates transfer of a computer program from one place to another. A storage media may be any available media that can be accessed by a computer.

By way of example, and not limitation, such computer-readable storage media can comprise random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), other optical disk storage, magnetic disk storage, or other magnetic storage devices, or any other medium that can be used to store desired program code in the form of instructions or data structures and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable storage medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, a physical storage medium such as a compact disc (CD) or floppy disk, etc.). Moreover, any other suitable technique for providing the methods and techniques described herein to a device can be utilized.

It is to be understood that the claims are not limited to the precise configuration and components illustrated above. The previous description of the disclosed embodiments is provided to enable a person skilled in the art to make or use the disclosed embodiments. While the foregoing is directed to aspects of the present disclosure, other and further aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A method comprising:
   intercepting, at a first processor of a first device, a first message from an application of the first device, the first message comprising a first socket request that includes a first operand, wherein the first socket request is associated with a transport protocol layer;
   intercepting, at the first processor, a second message from the application, the second message comprising a second socket request that includes a second operand, and wherein the second socket request is associated with the transport protocol layer;
   generating, at a second processor of the first device, a first packet based on the first operand and the second operand, wherein the second processor is associated with an access network layer; and
   transmitting the first packet via the access network layer from the first device to a second device, wherein a processor of the second device is configured to host a transport protocol stack on behalf of the first device and to use the transport protocol stack to generate one or more transport protocol packets based on the first packet.

2. The method of claim 1, wherein the transport protocol layer comprises a transmission control protocol (TCP)/Internet protocol (IP) layer, wherein the first processor and the second processor are the same processor, and wherein the access network layer comprises a media access control (MAC) layer.

3. The method of claim 1, wherein transmitting the first packet comprises transmitting the first packet to a destination other than a destination of the intercepted first message.

4. The method of claim 1, wherein hosting the transport protocol stack comprises opening and maintaining the transport protocol stack, wherein the first device does not host the transport protocol stack and delegates hosting the transport protocol stack to the second device, and wherein the second device hosts protocol stacks for a plurality of devices.

5. The method of claim 1, wherein the first packet is not a transport protocol packet, and wherein the first packet is wirelessly transmitted from the first device to the second device.

6. The method of claim 1, wherein the first socket request includes a connect request.

7. The method of claim 1, wherein generating the first packet comprises:
identifying a previously generated packet awaiting transmission; and
comparing an attribute of the first packet with an attribute of the previously generated packet.

8. The method of claim 1, further comprising;
generating a second packet based on a third operand included in a third message intercepted from the application;
identifying a previously generated packet awaiting transmission;
comparing an attribute of the second packet with an attribute of the previously generated packet; and
discarding the second packet based on a determination that the attribute of the second packet matches the attribute of the previously generated packet, wherein the attribute of the second packet includes one of the third operand, a parameter associated with the third message, or a combination thereof.

9. The method of claim 1, wherein the second processor comprises a reduced power communication processor.

10. An apparatus comprising:
a processor configured to:
intercept a first message issued by an application of a first device, wherein the first message comprises a first socket request that includes a first operand, and wherein the first socket request is associated with a transport protocol layer;
intercept a second message from the application, wherein the second message comprises a second socket request that includes a second operand, and wherein the second socket request is associated with the transport protocol layer; and
generate a first packet based on the first operand and the second operand, wherein the first packet is associated with an access network layer; and
a transmitter configured to transmit the first packet via the access network layer to a second device, wherein a second processor of the second device is configured to host a transport protocol stack to generate one or more transport protocol packets based on the first packet.

11. The apparatus of claim 10, wherein the processor includes an encoder configured to generate the first packet.

12. The apparatus of claim 10, further comprising:
a receiver configured to receive a second packet from the second device, wherein the second packet is responsive to the first socket request; and
a decoder configured to provide the second packet to the application that initiated the message, wherein the application is executed by the processor.

13. The apparatus of claim 10, wherein the operand is one of connect, bind, listen, accept, get host by name, and get host by address.

14. The apparatus of claim 10, wherein the processor further comprises a payload generator, the payload generator configured to:
generate a second packet based on a third operand included in a third message intercepted from the application;
identify a previously generated packet awaiting transmission;
compare an attribute of the second packet with an attribute of the previously generated packet; and
discard the second packet based on a determination that the attribute of the second packet matches the attribute of the previously generated packet.

15. The apparatus of claim 10, wherein:
the transport protocol layer comprises a transmission control protocol (TCP)/Internet protocol (IP) layer;
after the application of the first device issues the first message and the second message for processing by the transport protocol layer, the first message and the second message are intercepted by the access network layer; and
the access network layer generates the first packet using the first operand and the second operand.

16. An apparatus comprising:
means for intercepting, at a first device, a first message and a second message from an application of the first device, wherein the first message comprises a first socket request that includes a first operand, wherein the second message comprises a second socket request that includes a second operand, and wherein the first socket request and the second socket request are associated with a transport protocol layer;
means for generating, at the first device, a first packet based on the first operand and the second operand, wherein the first packet is associated with an access network layer; and
means for transmitting the first packet via the access network layer from the first device to a second device, wherein a processor of the second device is configured to host a transport protocol stack on behalf of the first device and to use the transport protocol stack to generate one or more transport protocol packets based on the first packet.

17. The apparatus of claim 16, further comprising means for receiving a second packet from the second device responsive to the first message.

18. A processor-readable medium comprising storing instructions that, when executed by a processor, cause the processor to perform operations comprising:
intercepting a first message issued by an application of a first device, wherein the first message comprises a first socket request that includes a first operand, and wherein the first socket request is associated with a transport protocol layer
intercepting a second message from the application, wherein the second message comprises a second socket request that includes a second operand, and wherein the second socket request is associated with the transport protocol layer;
generating a first packet based on the first operand and the second operand, wherein the first packet is associated with an access network layer; and
initiating a transmission of the first packet to a second device via the access network layer, wherein a second processor of the second device is configured to host a transport protocol stack on behalf of the first device and to use the transport protocol stack to generate one or more transport protocol packets based on the first packet.

19. A method comprising:
receiving, from a first device at a receiver of a second device, a first packet via an access network layer, wherein the first packet is generated based on a first message and a second message that are issued by an application of the first device and that are associated with a transport protocol layer, wherein the first message comprises a first socket request that includes a first operand, and wherein the second message comprises a second socket request that includes a second operand; and using, at a processor of the second device, a transport protocol stack to generate one or more transport protocol packets based on the first packet, wherein the processor is configured to host the transport protocol stack on behalf of the first device.

20. The method of claim 19, wherein the first packet is received at the second device via a wireless transmission from the first device.

21. The method of claim 19, further comprising:
in response to determining that the first socket request is associated with a connect request, initiating the hosted transport protocol stack.

22. The method of claim 21, wherein initiating the hosted transport protocol stack comprises opening and maintaining the transport protocol stack, wherein the first device comprises a mobile communication device, and wherein the second device comprises an access point.

23. The method of claim 19, further comprising:
receiving, from a third device, a first control signal associated with the first socket request;
generating a response to the first control signal; and
transmitting the response to the first control signal to the third device.

24. The method of claim 23, wherein the third device comprises an application server, wherein the first control signal is one of an address resolution protocol (ARP) signal, a keep-alive signal, or a discovery protocol signal.

25. The method of claim 23, further comprising:
generating, at the second device, a second control signal associated with the first message; and
transmitting the second control signal to the first device.

26. The method of claim 19, further comprising:
receiving, from a third device, a communication responsive to the first message;
generating a second packet based on the communication; and
transmitting the second packet to the first device.

27. The method of claim 19, further comprising:
receiving, from a third device, a communication responsive to the first message;
generating a second packet based on the communication;
identifying a previously generated packet awaiting transmission;
comparing an attribute of the second packet with an attribute of the previously generated packet; and
discarding the second packet based on a determination that the attribute of the second packet matches the attribute of the previously generated packet.

28. The method of claim 19, further comprising maintaining a pool of resources unassociated with the first packet prior to generating the one or more transport protocol packets.

29. The method of claim 28, wherein the one or more transport protocol packets are generated based on an association of a resource from the pool of resources with the first packet.

30. An apparatus comprising:
a receiver configured to receive a first packet from a first device via an access network layer, wherein the first packet is based on a first message and a second message that are issued by an application of the first device and that are associated with a transport protocol layer, wherein the first message comprises a first socket request that includes a first operand, and wherein the second message comprises a second socket request that includes a second operand; and
a processor configured to:
host a transport protocol stack on behalf of the first device; and
use the transport protocol stack to generate one or more transport protocol packets based on the first packet.

31. The apparatus of claim 30, wherein the transport protocol layer comprises a transmission control protocol (TCP)/Internet protocol (IP) layer.

32. The apparatus of claim 30, wherein the processor comprises an encoder configured to generate a control signal associated with the message.

33. The apparatus of claim 30, wherein the processor is further configured to:
generate the one or more transport protocol packets based on at least one of the first operand and the second operand; and
determine whether the at least one of the first operand and the second operand is associated with a connect request, the connect request associated with establishing a communication channel with an application server.

34. The apparatus of claim 30, wherein the processor is further configured to:
generate a second packet based on a communication received from a third device;
identify a previously generated packet awaiting transmission;
compare an attribute of the second packet with an attribute of the previously generated packet; and
discard the second packet based on a determination that the attribute of the second packet matches the attribute of the previously generated packet.

35. The apparatus of claim 30, further comprising a memory storing a pool of resources unassociated with the first packet, wherein the one or more transport protocol packets are generated based on an association of a resource from the pool of resources with the first packet.

36. The apparatus of claim 35, wherein the pool of resources comprises one or more internet protocol addresses.

37. An apparatus comprising:
means for receiving, from a first device, a first packet via an access network layer, wherein the first packet is based on a first message and a second message that are issued by an application of the first device and that are associated with a transport protocol layer, wherein the first message comprises a first socket request that includes a first operand, and wherein the second message comprises a second socket request that includes a second operand; and
means for using a transport protocol stack to generate one or more transport protocol packets based on the first packet, wherein the means for using the transport protocol stack is configured to host the transport protocol stack on behalf of the first device.

38. The apparatus of claim 37, further comprising:
means for receiving a communication associated with the first packet from an application server; and
means for determining whether the communication corresponds to one of a control signal or a third message.

39. The apparatus of claim 38, further comprising:
means for generating a response to the control signal in response to a determination that the communication is the control signal; and
means for transmitting the response to the control signal to the application server.

40. The apparatus of claim 39, further comprising:
  means for generating a second packet based on the third message in response to a determination that the communication is the third message; and
  means for transmitting the second packet to the application server.

41. The apparatus of claim 37, further comprising means for maintaining a pool of resources unassociated with the first packet, wherein the one or more transport protocol packets are generated based on an association of a resource from the pool of resources with the first packet.

42. A processor-readable medium storing instructions that, when executed by a processor, cause the processor to perform operations comprising:
  receiving, from a first device, a first packet via an access network layer, wherein the first packet is based on a first message and a second message that are issued by an application of the first device and that are associated with a transport protocol layer, wherein the first message comprises a first socket request that includes a first operand, and wherein the second message comprises a second socket request that includes a second operand; and
  using a transport protocol stack to generate one or more transport protocol packets based on the first packet, wherein the transport protocol stack is hosted on behalf of the first device.

* * * * *